US010083188B2

(12) United States Patent
Oi et al.

(10) Patent No.: US 10,083,188 B2
(45) Date of Patent: Sep. 25, 2018

(54) INFORMATION PROCESSING DEVICE, MAP UPDATE METHOD, PROGRAM, AND INFORMATION PROCESSING SYSTEM

(71) Applicant: SONY CORPORATION, Tokyo (JP)

(72) Inventors: Kenichiro Oi, Kanagawa (JP); Quan Wang, Los Angeles, CA (US); Kouichi Matsuda, Tokyo (JP); Takayuki Yoshigahara, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/647,813

(22) Filed: Jul. 12, 2017

(65) Prior Publication Data
US 2017/0322949 A1 Nov. 9, 2017

Related U.S. Application Data

(63) Continuation of application No. 15/253,188, filed on Aug. 31, 2016, now Pat. No. 9,727,580, which is a
(Continued)

(30) Foreign Application Priority Data
Mar. 9, 2010 (JP) .................. 2010-051731

(51) Int. Cl.
G01C 21/00 (2006.01)
G06F 17/30 (2006.01)
(Continued)

(52) U.S. Cl.
CPC .... G06F 17/30241 (2013.01); G06F 17/3028 (2013.01); G06F 17/30377 (2013.01);
(Continued)

(58) Field of Classification Search
CPC .................................. G06F 17/30241
See application file for complete search history.

(56) References Cited

U.S. PATENT DOCUMENTS 5,821,880 A 10/1998 Morimoto et al.
9,014,970 B2* 4/2015 Oi ..................... G06F 17/30241
701/400
(Continued)

FOREIGN PATENT DOCUMENTS

EP 2000953 A2 5/2008
JP 2006-209784 8/2006

OTHER PUBLICATIONS

Nov. 30, 2015, EP communication issued for related EP application No. 11156227.8.
(Continued)

Primary Examiner — Hussein Elchanti
(74) Attorney, Agent, or Firm — Paratus Law Group, PLLC

(57) ABSTRACT

There is provided an information processing device including: a global map acquiring unit that acquires at least a part of a global map representing positions of objects in a real space where a plurality of users are in activity; a local map generating unit that generates a local map representing positions of nearby objects detectable by a device of one user among the plurality of users; and an updating unit that updates the global map based on position data of objects included in the local map.

15 Claims, 22 Drawing Sheets

Related U.S. Application Data continuation of application No. 14/691,197, filed on Apr. 20, 2015, now Pat. No. 9,449,023, which is a continuation of application No. 13/037,788, filed on Mar. 1, 2011, now Pat. No. 9,014,970.

(51) Int. Cl.

| | | |
|---|---|---|
| *G06T 7/70* | (2017.01) | |
| *G06T 15/20* | (2011.01) | |
| *G06T 7/60* | (2017.01) | |
| *G06T 7/20* | (2017.01) | |
| *G06T 3/20* | (2006.01) | |
| *G06T 11/20* | (2006.01) | |
| *H04W 4/02* | (2018.01) | |
| *G09G 5/00* | (2006.01) | |
| *G06T 1/20* | (2006.01) | |
| *G06K 9/18* | (2006.01) | |

(52) U.S. Cl.
CPC ............. *G06K 9/18* (2013.01); *G06T 1/20* (2013.01); *G06T 3/20* (2013.01); *G06T 7/20* (2013.01); *G06T 7/60* (2013.01); *G06T 7/70* (2017.01); *G06T 11/20* (2013.01); *G06T 15/20* (2013.01); *G09G 5/006* (2013.01); *H04W 4/02* (2013.01); *H04W 4/025* (2013.01); *G06T 2200/04* (2013.01); *G06T 2219/024* (2013.01); *G09G 2370/02* (2013.01)

(56) References Cited

U.S. PATENT DOCUMENTS

| | | | |
|---|---|---|---|
| 9,449,023 B2* | 9/2016 | Oi | G06F 17/30241 |
| 2001/0036833 A1 | 11/2001 | Koshima et al. | |
| 2003/0065432 A1 | 4/2003 | Shuman et al. | |
| 2005/0144049 A1 | 6/2005 | Kuzunuki et al. | |
| 2006/0246922 A1 | 11/2006 | Gasbarro et al. | |
| 2007/0198176 A1 | 8/2007 | Endo et al. | |
| 2007/0213929 A1 | 9/2007 | Tanizaki et al. | |
| 2008/0208451 A1 | 8/2008 | Minami | |
| 2008/0288162 A1 | 11/2008 | Theimer et al. | |
| 2009/0177378 A1 | 7/2009 | Kamalsk et al. | |
| 2010/0042315 A1 | 2/2010 | Ikeuchi et al. | |
| 2010/0047744 A1 | 2/2010 | Miura | |
| 2010/0191456 A1 | 7/2010 | Nogawa | |
| 2010/0305849 A1 | 12/2010 | Nirhamo | |
| 2011/0153208 A1 | 6/2011 | Kruglick | |

OTHER PUBLICATIONS

Google Maps, Wikipedia, last revised on Mar. 2, 2010, https://en.wikipedia.org/w/index.php?title=Google_Maps&oldid=347229324, retrieved on Nov. 20, 2015.

Ann Morrison, et al., Like Bees Around the Hive: A Comparative Study of a Mobile Augmented Reality Map, CHI 2009 ~ Enhancing Reality, Apr. 8, 2009, pp. 1889-1898, Boston, MA, USA.

Eiman Kanjo, et al., MobGeoSen: facilitating personal geosensor data collection and visualization using mobile phones, Aug. 8, 2007, pp. 1-9, Springer-Verlag London Limited 2007.

Google Maps, "Get Directions, My Maps", online, http://maps.google.com, 1 page (Feb. 22, 2010).

Sekai Camera Support Center, "[CooKoo] Problems we saw after the completion of the maintenance on Nov. 17, [Update]", http://support.sekaicamera.com/en, pp. 1-7 (Dec. 3, 2010).

English-language European Search Report in corresponding EP1156227, dated Feb. 2, 2012.

* cited by examiner

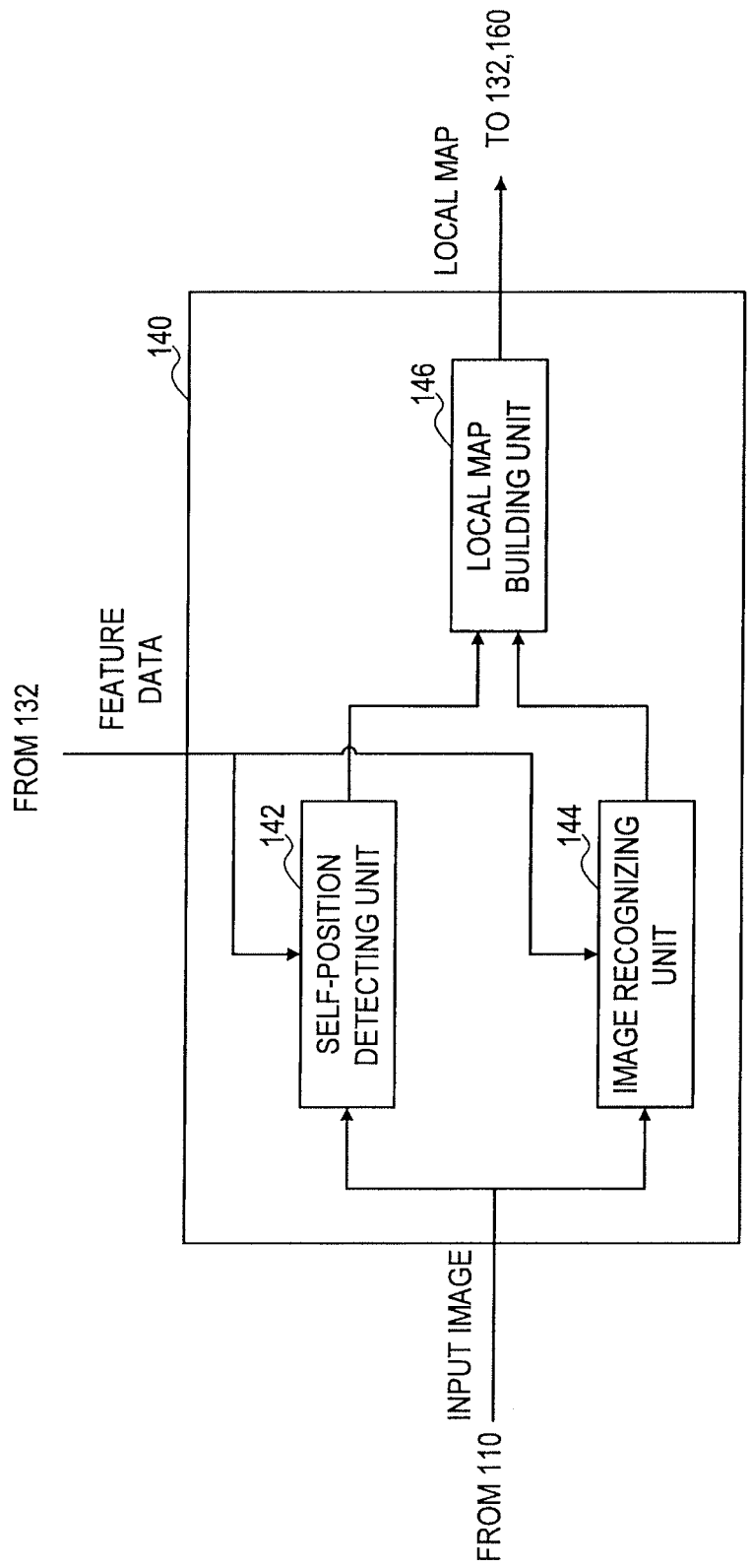

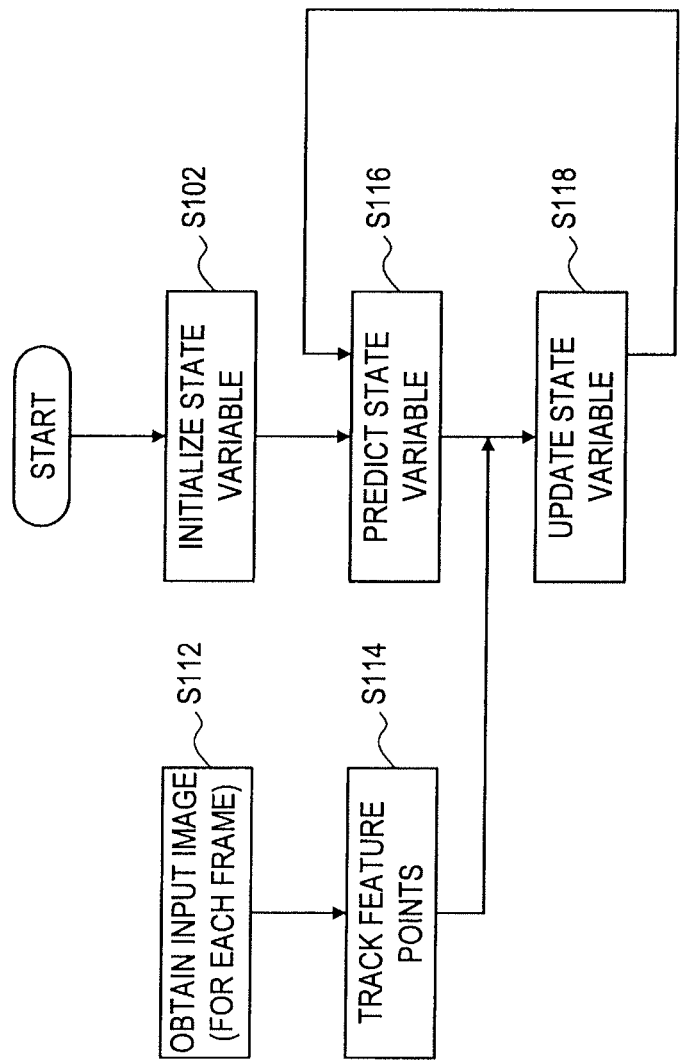

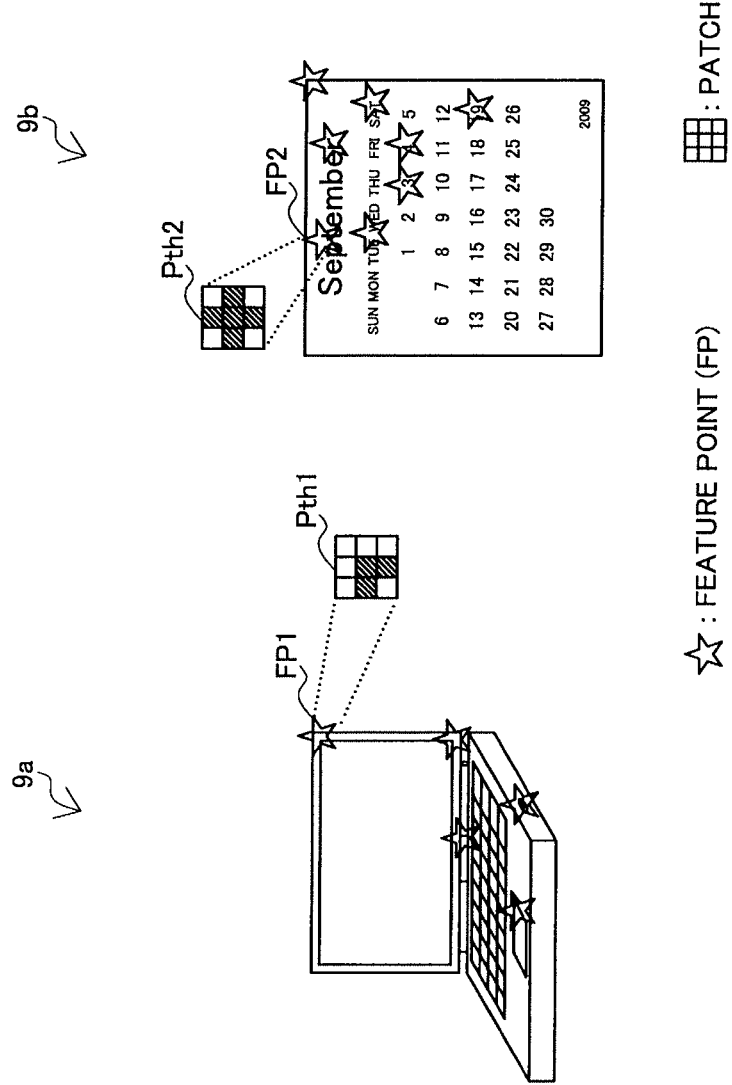

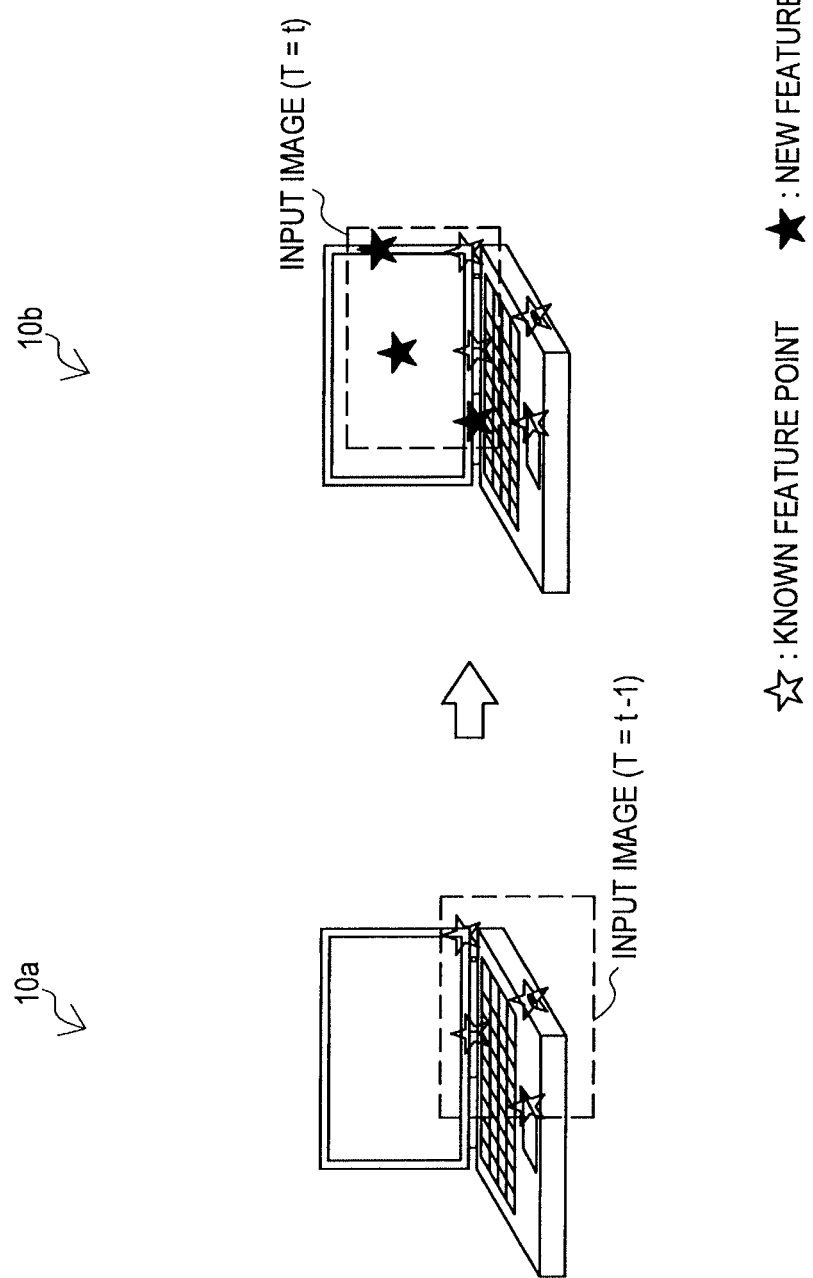

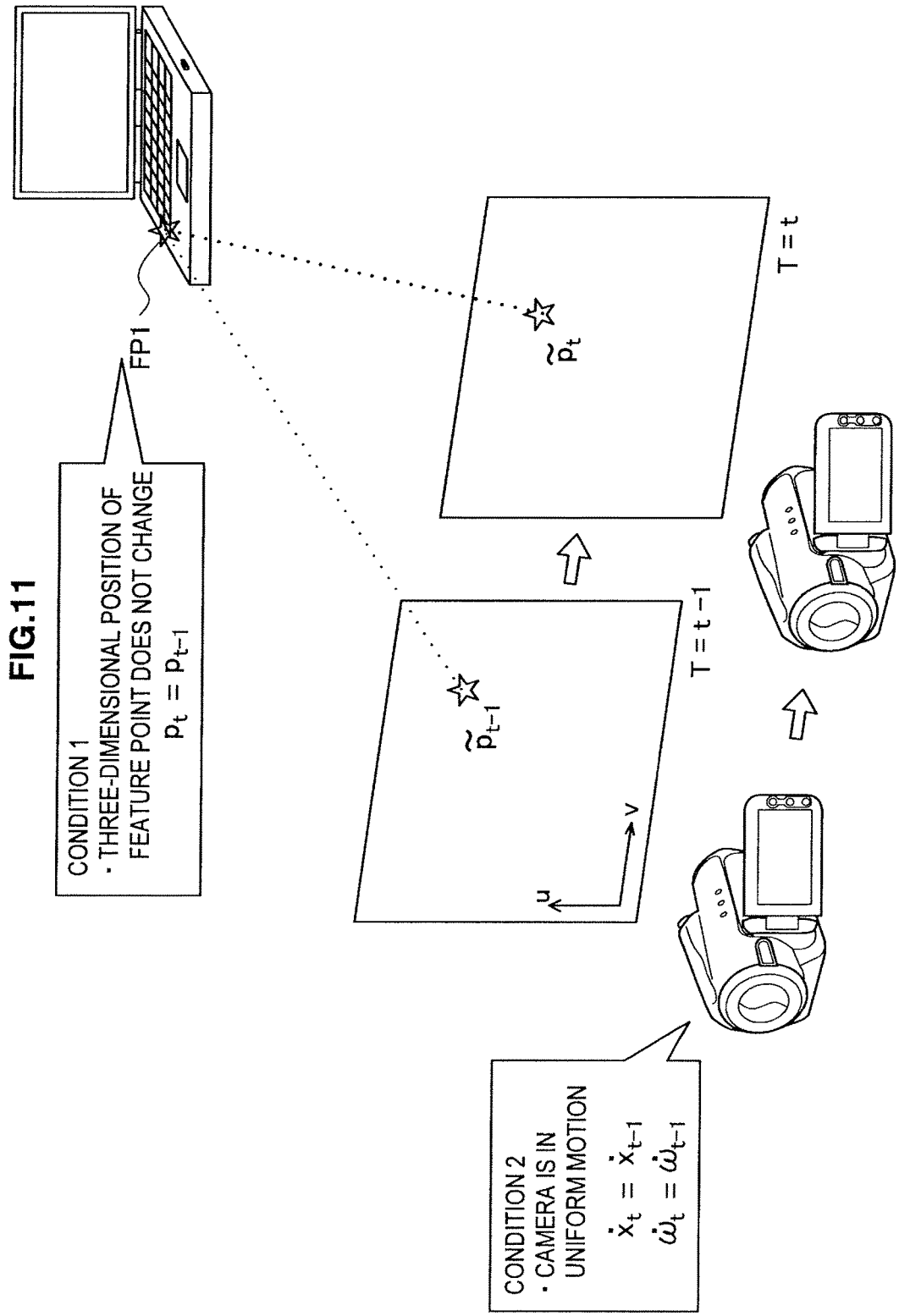

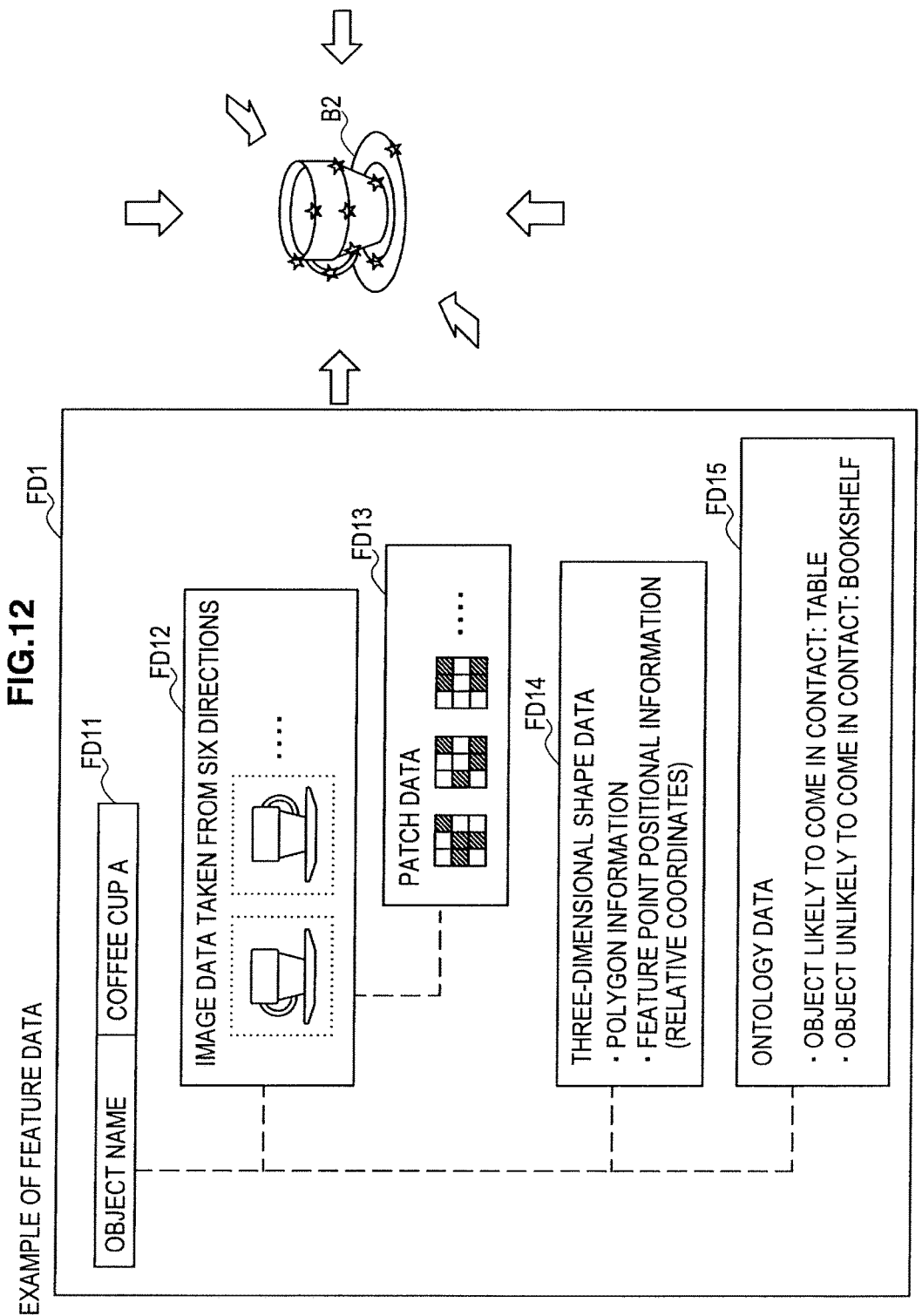

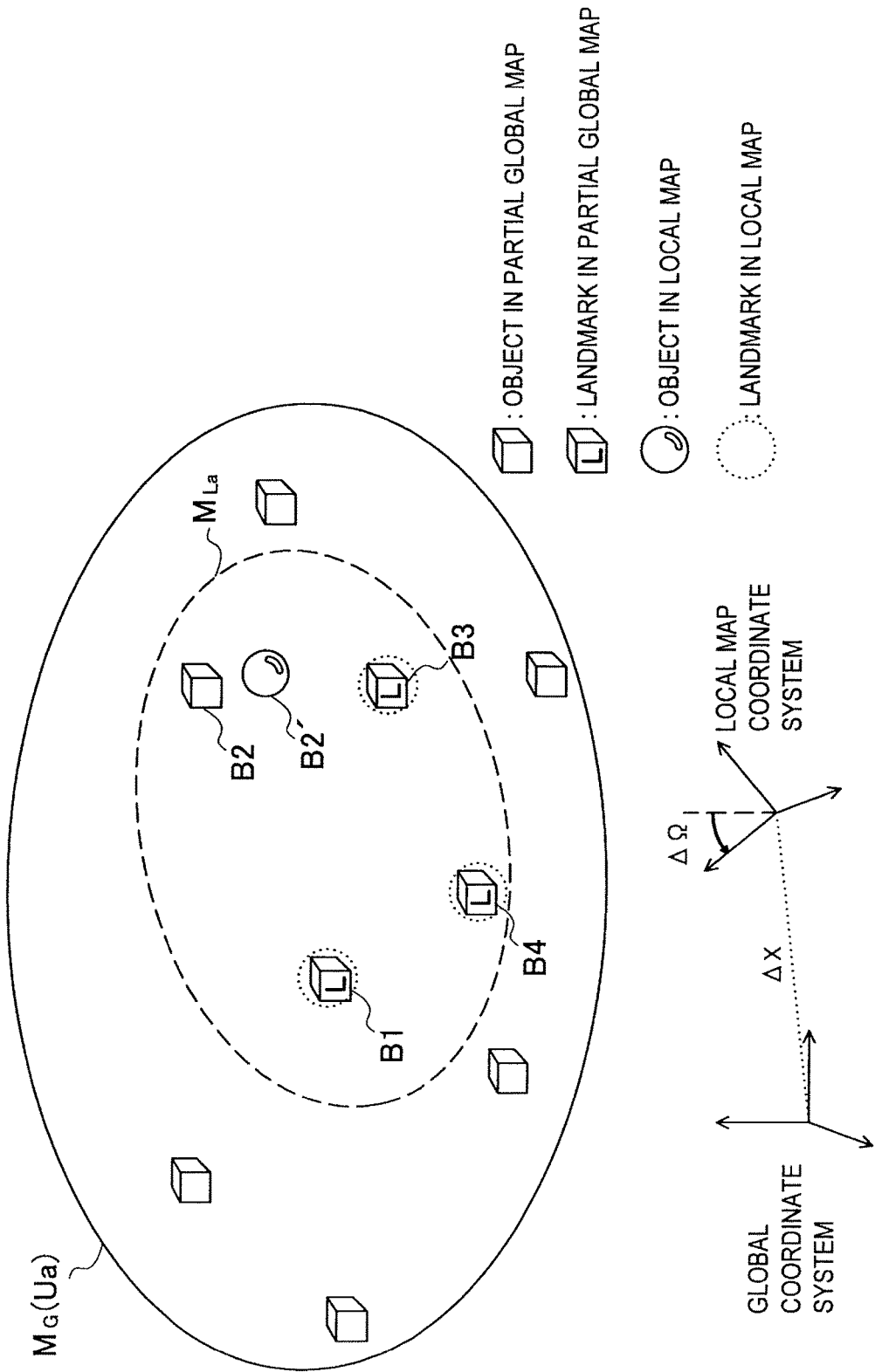

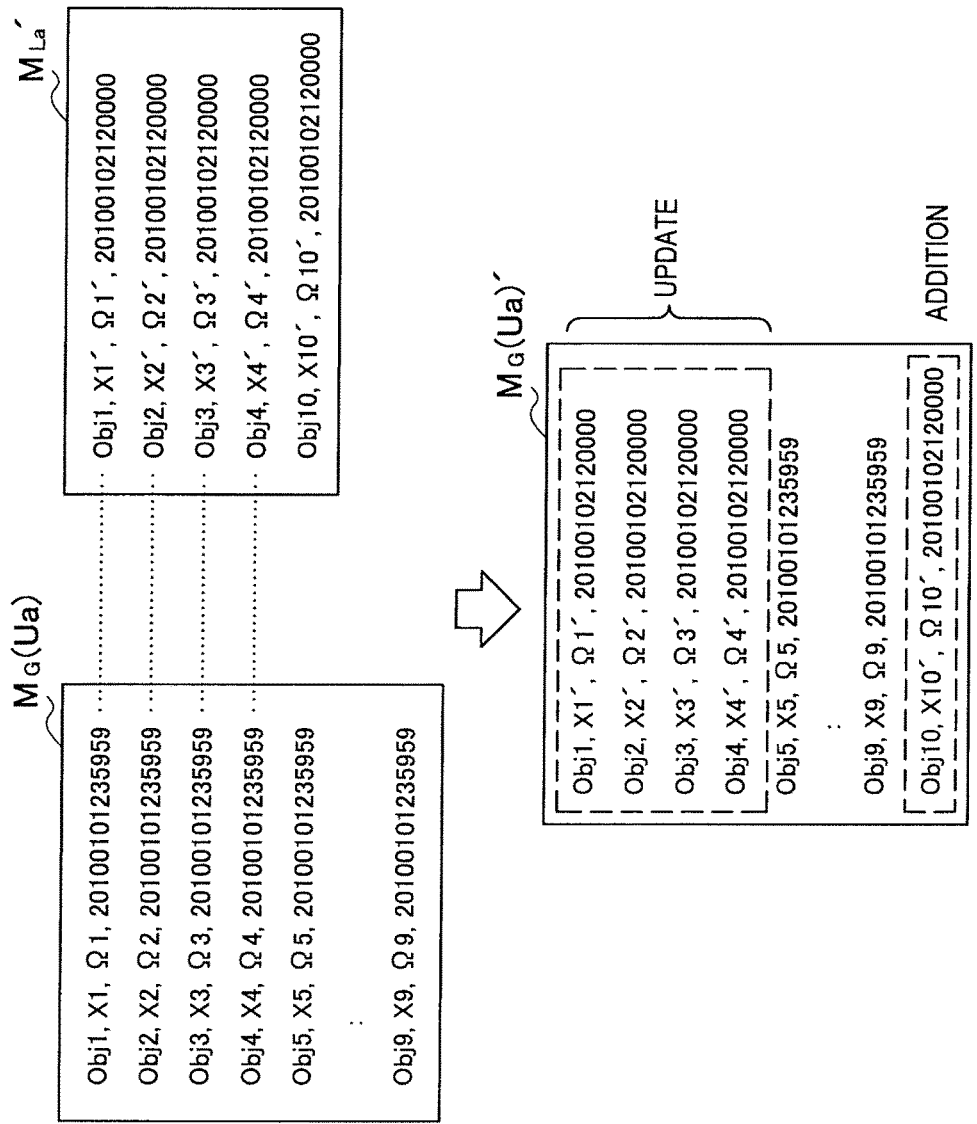

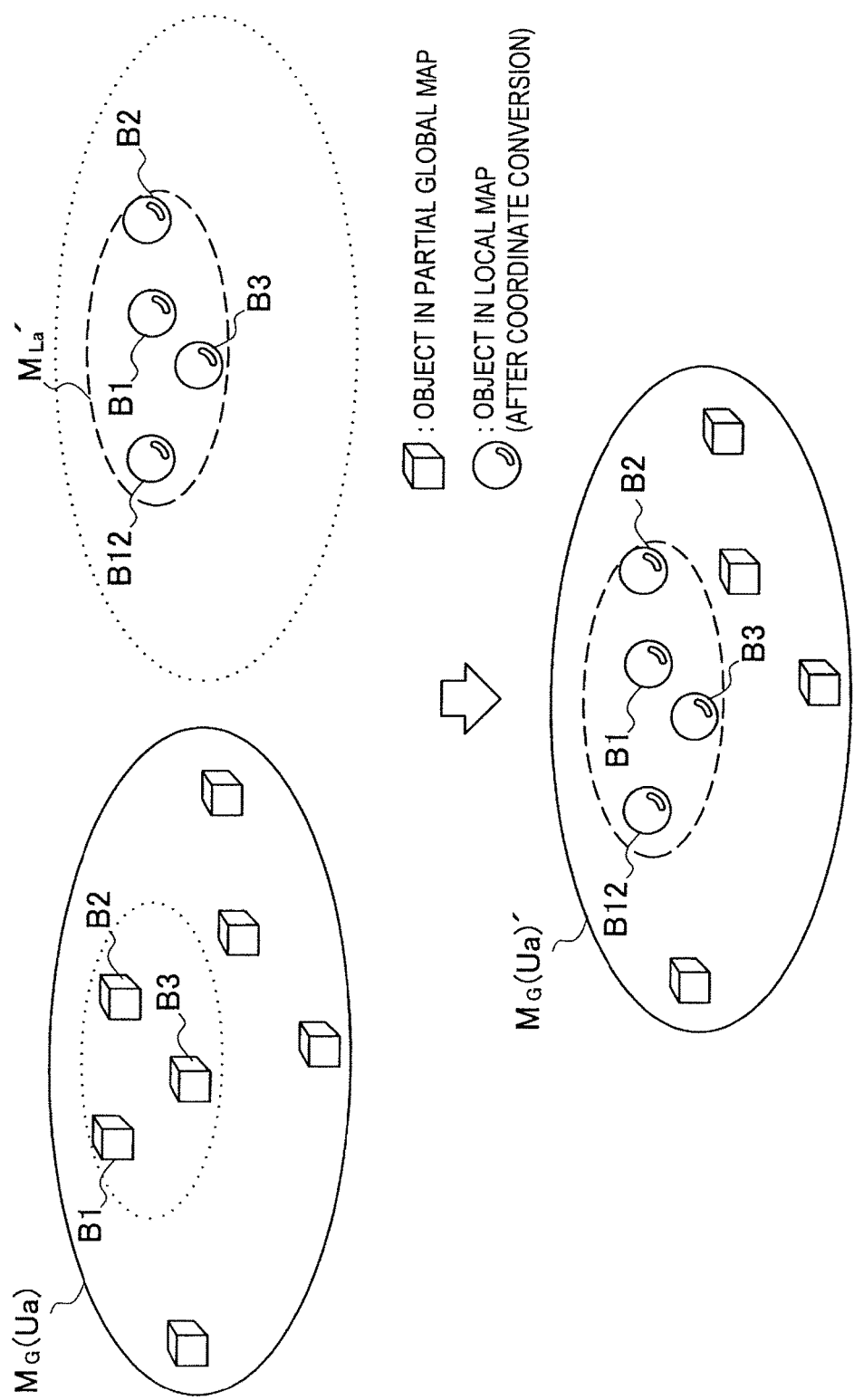

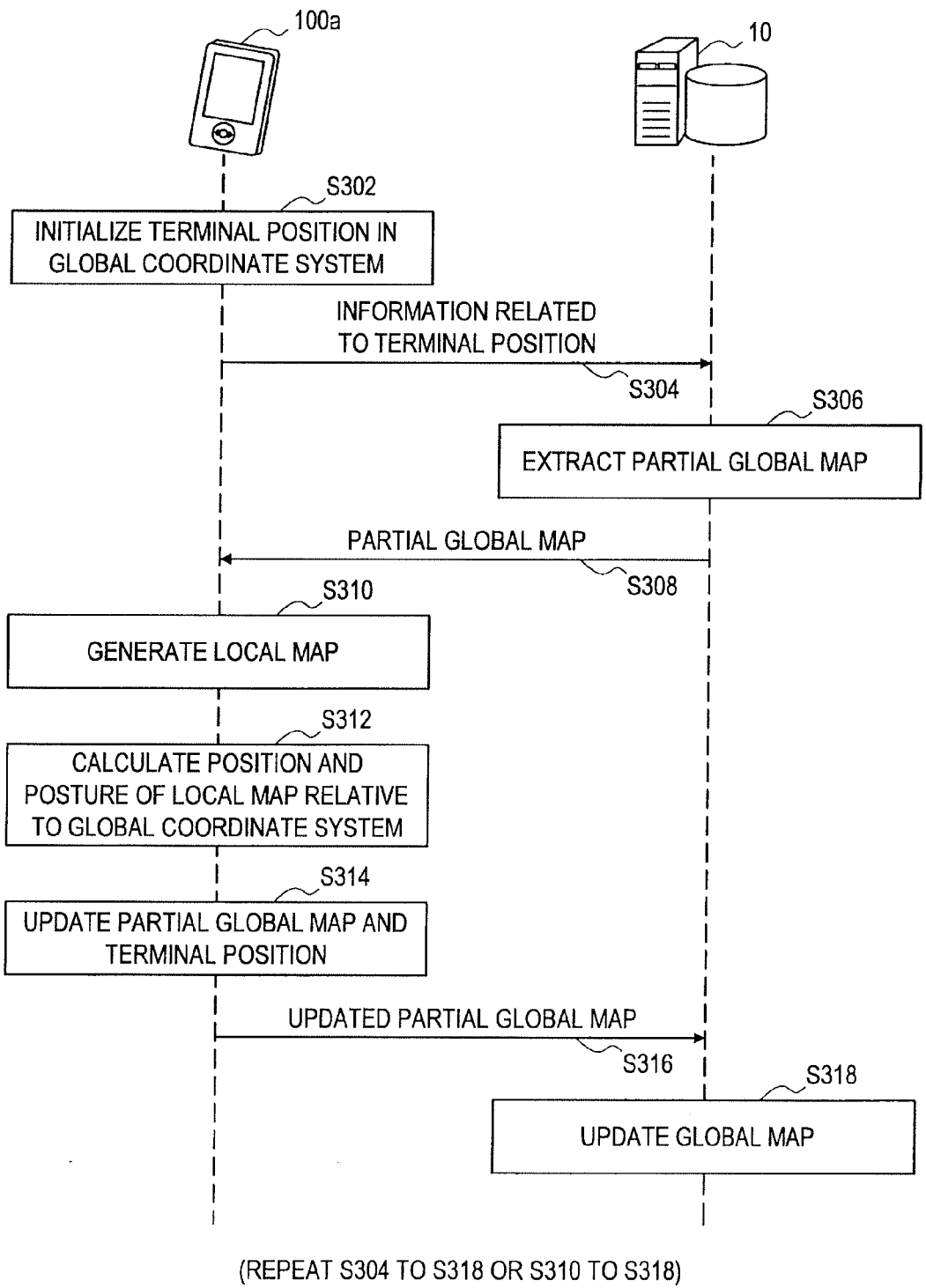

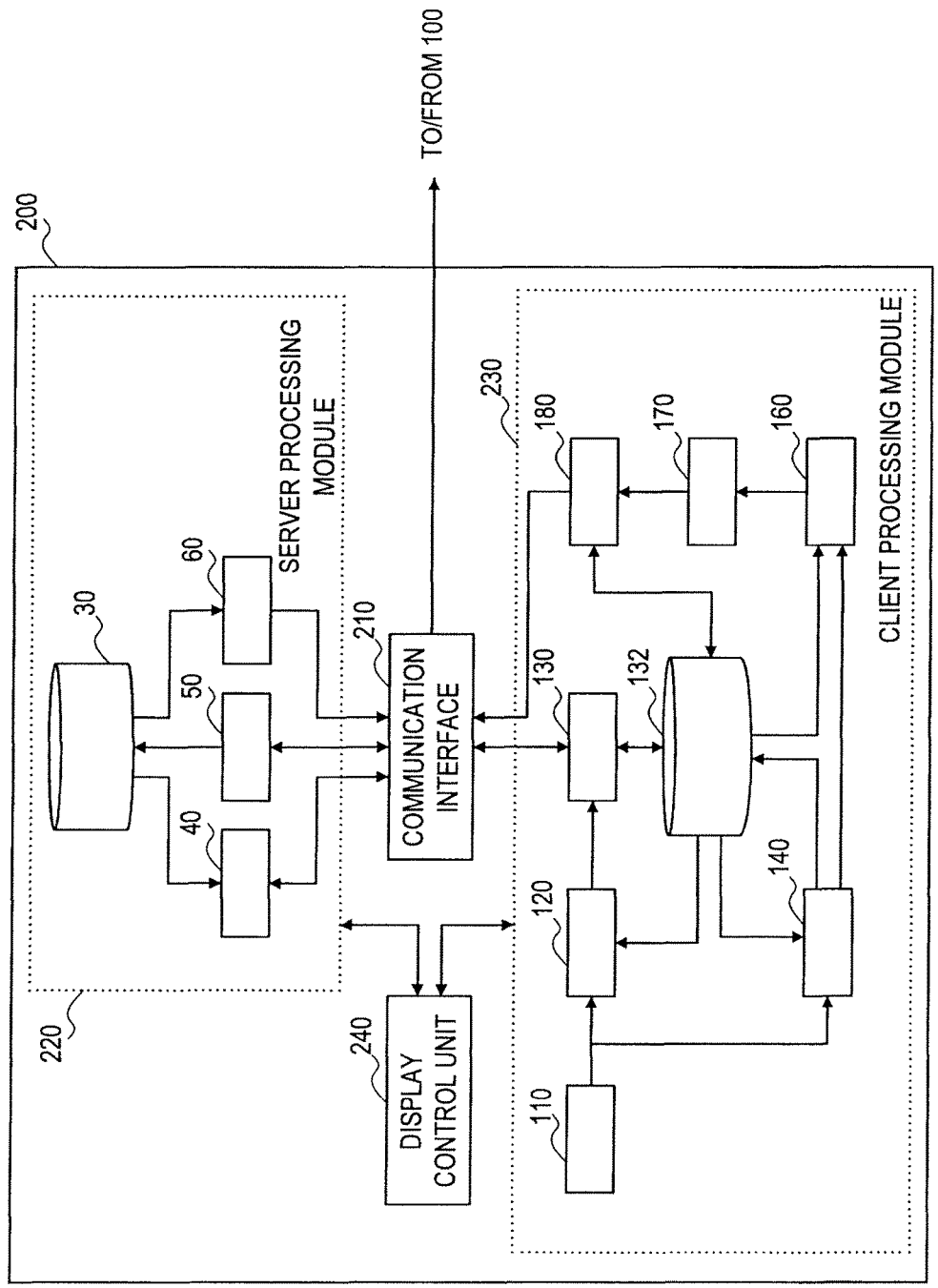

INFORMATION PROCESSING DEVICE, MAP UPDATE METHOD, PROGRAM, AND INFORMATION PROCESSING SYSTEM

CROSS REFERENCE TO PRIOR APPLICATION

This application is a continuation of U.S. patent application Ser. No. 15/253,188 (filed on Aug. 31, 2016), which is a continuation of U.S. patent application Ser. No. 14/691,197 (filed on Apr. 20, 2015 and issued as U.S. Pat. No. 9,449,023 on Sep. 20, 2016), which is a continuation of U.S. patent application Ser. No. 13/037,788 (filed on Mar. 1, 2011 and issued as U.S. Pat. No. 9,014,970 on Apr. 21, 2015) which claims priority to Japanese Patent Application No. 2010-051731 (filed on Mar. 9, 2010), which are all hereby incorporated by reference in their entirety.

BACKGROUND OF THE INVENTION

Field of the Invention

The present invention relates to an information processing device, a map update method, a program, and an image processing system.

Description of the Related Art

Various applications for a plurality of users to share a map representing positions of physical objects in the real space through a network are in practical use. As an example, there is an application that allows a user to associate information such as a comment or a photograph with a given position on a map and share the information or the map with other users (cf. Japanese Patent Application Laid-Open No. 2006-209784 and "Google Maps" (Internet URL: http://maps.google.com/)). Further, there is an application that associates a virtual tag with a given position on a map and displays an image captured using a camera function of a terminal with the tag superimposed thereon (cf. "Sekai Camera Support Center" (Internet URL: http://support.sekaicamera.com/en)).

SUMMARY OF THE INVENTION

However, in the existing map share applications, although information associated with a map can be updated at will by a user, the map itself does not change except for when a service provider updates it. Therefore, even when a user recognizes a change in the position of a physical object in the real space, it is difficult to quickly reflect the change on the map and share it with other users. Further, in a private space where a detailed map is not provided by a service provider, it is difficult to share a map or information associated with the map among users.

In light of the foregoing, it is desirable to provide novel and improved information processing device, map update method, program, and image processing system that enable a change in position of a physical object in the real space to be quickly shared among users.

According to an embodiment of the present invention, there is provided an information processing device including: a global map acquiring unit that acquires at least a part of a global map representing positions of objects in a real space where a plurality of users are in activity; a local map generating unit that generates a local map representing positions of nearby objects detectable by a device of one user among the plurality of users; and an updating unit that updates the global map based on position data of objects included in the local map.

The information processing device may further include: a calculating unit that calculates a relative position of the local map to the global map based on position data of objects included in the global map and position data of objects included in the local map; and a converting unit that performs coordinate conversion from the position data of objects included in the local map to data of a coordinate system of the global map according to the relative position of the local map, wherein the updating unit updates the global map by using the position data of objects included in the focal map after the coordinate conversion by the converting unit.

The information processing device may be a terminal device possessed by the one user.

The global map acquiring unit may acquire at least a part of the global map from a server device storing the global map, and the updating unit may update the global map of the server device by transmitting position data of objects to the server device.

The global map acquiring unit may acquire a part of the global map corresponding to a local area containing a position of the terminal device in the real space.

The global map acquiring unit may acquire a part of the global map representing positions of a predetermined number of objects located in close proximity to the terminal device.

The local map generating unit may generate the local map based on an input image obtained by imaging the real space using an imaging device and feature data indicating a feature of appearance of one or more objects.

The calculating unit may calculate the relative position of the local map based on position data of an immobile object included in common in the global map and the local map.

The calculating unit may calculate the relative position of the local map so that, when converting the position data of objects included in the local map into data of the coordinate system of the global map, a difference between the data after conversion and the position data of objects included in the global map is smaller as a whole.

The global map may include position data of each object in the real space in the coordinate system of the global map and a time stamp related to the position data.

The information processing device may further include: a display control unit that at least partially visualizes the global map onto a screen in response to an instruction from a user.

According to another embodiment of the present invention, there is provided a map update method for updating a global map representing positions of objects in a real space where a plurality of users are in activity, performed by an information processing device, the method including steps of: acquiring at least a part of the global map; generating a local map representing positions of nearby objects detectable by the information processing device; and updating the global map based on position data of objects included in the local map.

According to another embodiment of the present invention, there is provided a program for causing a computer for controlling an information processing device to function as; a global map acquiring unit that acquires at least a part of a global map representing positions of objects in a real space where a plurality of users are in activity; a local map generating unit that generates a local map representing positions of nearby objects detectable by a device of one user among the plurality of users; and an updating unit that updates the global map based on position data of objects included in the local map.

According to another embodiment of the present invention, there is provided an information processing system including: a server device that stores a global map representing positions of objects in a real space where a plurality of users are in activity using a storage medium; and an information processing device possessed by one user among the plurality of users, the information processing device including a global map acquiring unit that acquires at least a part of the global map from the server device, a local map generating unit that generates a local map representing positions of nearby objects detectable by the information processing device, and an updating unit that updates the global map based on position data of objects included in the local map.

According to the embodiments of the present invention described above, it is possible to provide the information processing device, the map update method, the program, and the image processing system that enable a change in position of a physical object in the real space to be quickly shared among users.

BRIEF DESCRIPTION OF THE DRAWINGS

FIG. 7 is a block diagram illustrating an example of a detailed configuration of a local map generating unit according to an embodiment;

FIG. 8 is a flowchart illustrating an example of a flow of a self-position detection process according to an embodiment;

FIG. 9 is an illustrative diagram for illustrating a feature point set on an object;

FIG. 10 is an illustrative diagram for illustrating addition of a feature point;

FIG. 11 is an illustrative diagram for illustrating an example of a prediction model;

FIG. 12 is an illustrative diagram for illustrating an example of a configuration of feature data;

FIG. 14A is an illustrative diagram for illustrating an example of a map matching process by a calculating unit according to an embodiment;

FIG. 15A is an illustrative diagram for illustrating an example of a global map update process according to an embodiment;

FIG. 15B is an illustrative diagram for illustrating another example of a global map update process according to an embodiment;

FIG. 16 is a flowchart illustrating an example of a flow of a map update process between a map management server and a terminal device according to an embodiment;

FIG. 17 is a block diagram illustrating an example of a configuration of a super client according to an embodiment.

DETAILED DESCRIPTION OF THE EMBODIMENTS

Figure 1:
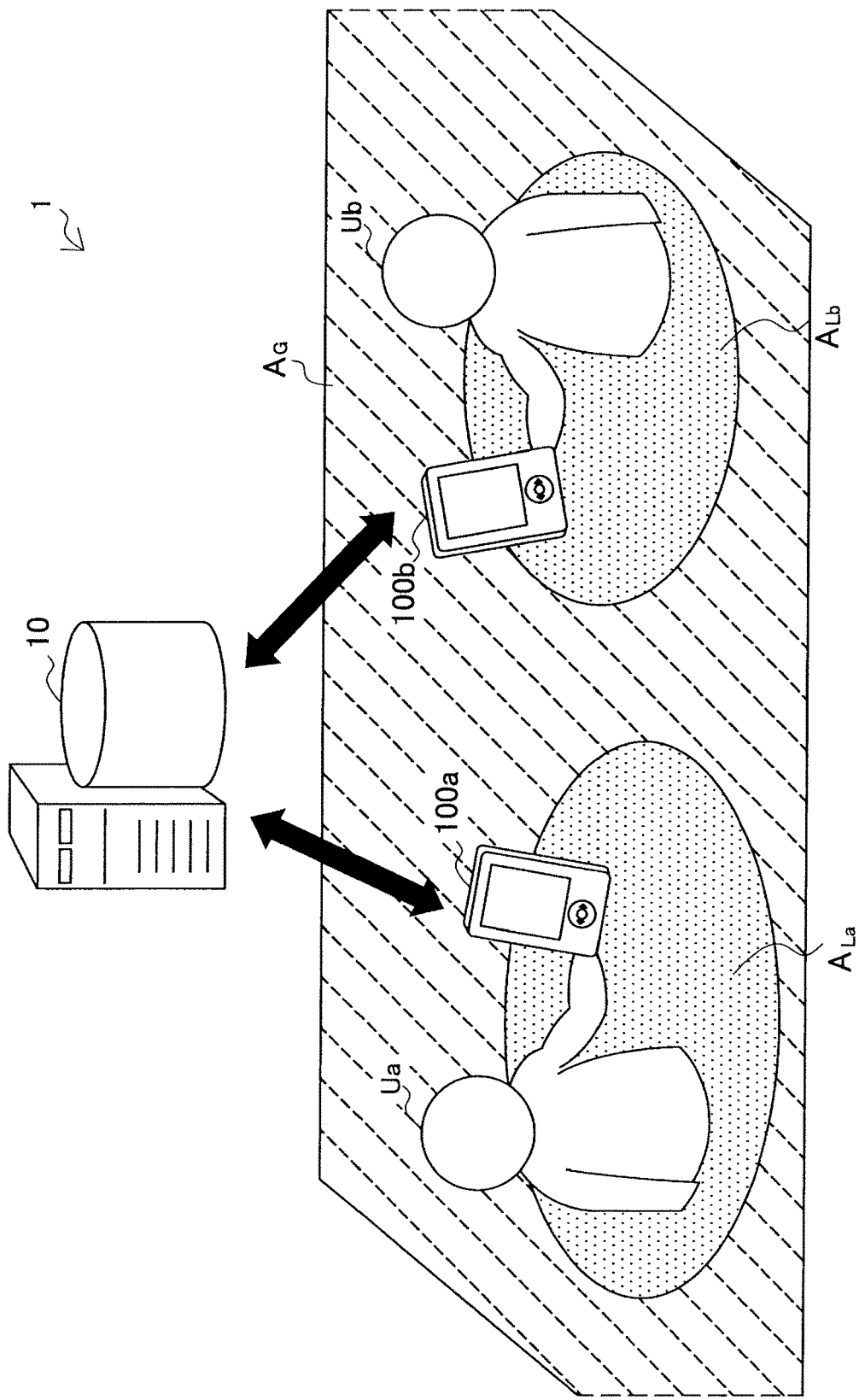
FIG. 1 is a schematic diagram for illustrating an overview of a system according to an embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Preferred embodiments of the present invention will be described hereinafter in the following order.
1. Overview of System
1-1. Example of System Configuration
1-2. Example of Position Data
2. Configuration of Map Management Server According to Embodiment
3. Configuration of Terminal Device According to Embodiment
3-1. Communication Interface
3-2. Imaging Unit
3-3. Initializing unit
3-4. Global Map Acquiring unit
3-5. Local Map Generating Unit
3-6. Calculating Unit
3-7. Converting Unit
3-8. Updating Unit
3-9. Display Control Unit
4. Flow of Process
5. Alternative Example
5-1. Super Client
5-2. Sharing of Additional information
6. Summary

1. OVERVIEW OF SYSTEM

[1-3. Example of System Configuration]

Figure 2:
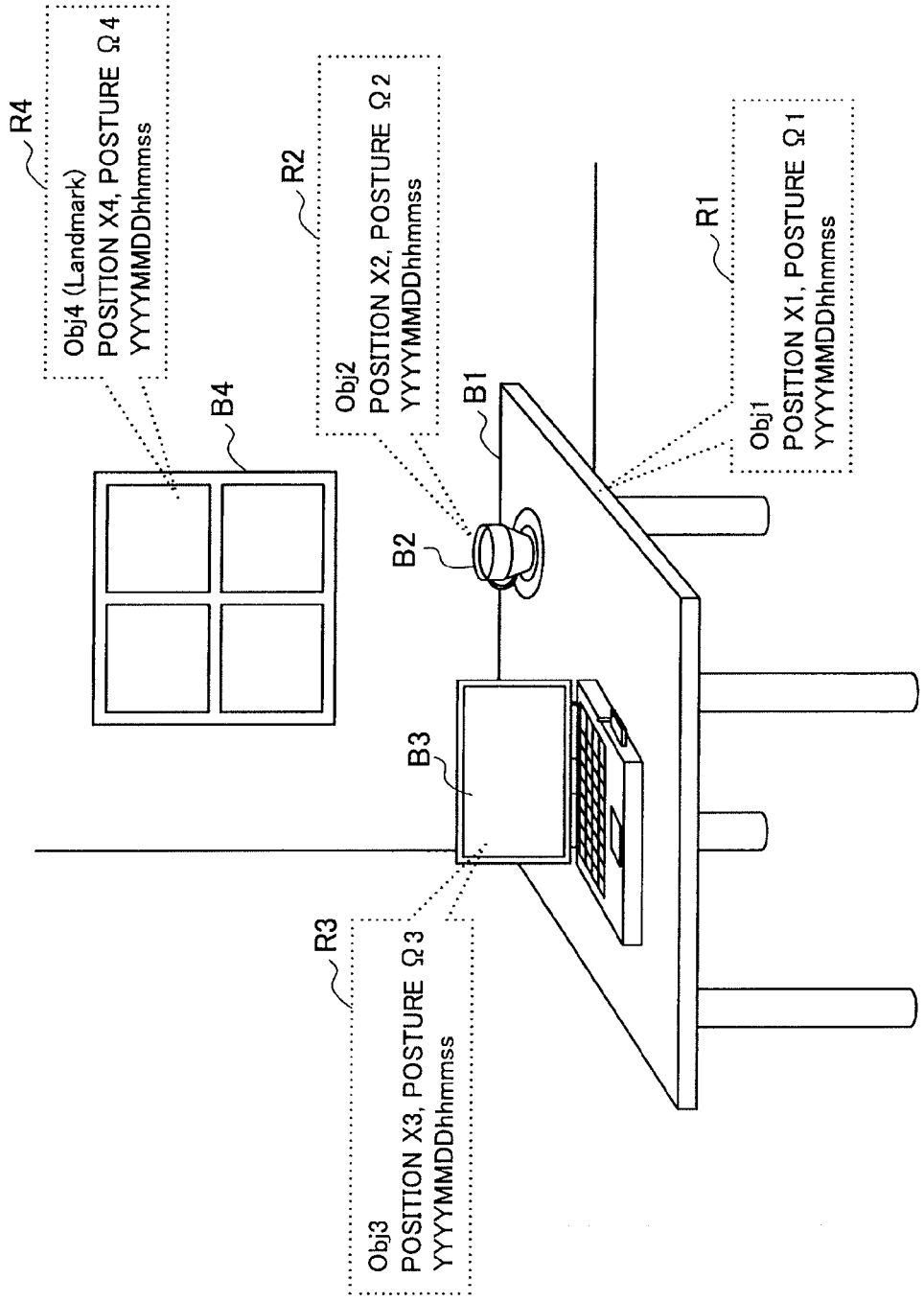
FIG. 2 is a schematic diagram for illustrating position data of objects included in a global map and a local map.

An overview of a system according to an embodiment of the present invention is described firstly with reference to FIGS. 1 and 2. FIG. 1 is a schematic diagram illustrating an overview of an image processing system 1 according to an embodiment of the present invention. Referring to FIG. 1, the image processing system 1 according to the embodiment includes a map management server 10, a terminal device 100a and a terminal device 100b.

The map management server 10 is an information processing device that provides a map share service for allowing a map and information associated with the map to be shared among a plurality of users. The map management server 10 has a database internally or externally and stores a global map, which is described later, in the database. The map management server 10 is typically implemented by using a general-purpose information processing device such as a personal computer (PC) or a work station.

In this specification, a map managed by the map management server 10 is referred to as a global map. The global map is a map that represents positions of physical objects in the real space ail over a service area $A_G$ of the map share service.

The terminal device 100a is an information processing device possessed by a user Ua. The terminal device 100b is m information processing device possessed by a user Ub. In this specification, when there is no particular need to distinguish between the terminal device 100a and the terminal device 100b, they are referred to collectively as the terminal device 100 by eliminating the alphabetical letter affixed to the reference numeral. The terminal device 100 can communicate with the map management server 10 through a communication connection by wire or wireless. The terminal device 100 may typically be an information processing device of any type, such as PC, smart phone, personal digital assistants (PDA), a portable music, player or a game terminal.

The terminal device 100 has a sensor function, capable of detecting positions of nearby objects. Then, the terminal device 100 generates a local map that represents positions of objects in the vicinity of its own device (e.g. in an area $A_{La}$ or an area $A_{Lb}$) using the sensor function. In this embodiment, a case of using Simultaneous localization and mapping (SLAM) technology that can simultaneously estimate a position and a posture of a camera and a position of a feature point of an object present on an input image using a monocular camera as an example of the sensor function is described.

Farther, the terminal device 100 has an update function that updates the global map managed by the map management server 10 using the generated local map and a display function that displays the latest global map (or the global map at a certain point of time in the past). Specifically, the user Ua can view the global map updated by the terminal device 100b possessed by the user Ub on a screen of the terminal device 100a, for example. Further, the user Ub can view the global map updated by the terminal device 100a possessed by the user Ua on a screen of the terminal device 100b, for example.

[1-2. Example of Position Data]

FIG. 2 is a schematic diagram for illustrating position data of objects included in a global map and a local map.

FIG. 2 shows four physical objects B1 to B4 present in the real space. The object B1 is a table. The object B2 is a coffee cup. The object B3 is a notebook PC. The object B4 is a window. The position of the object B4 usually does not move. In this specification, the object which does not move is referred to as an immobile object or a landmark. FIG. 2 further shows position data R1 to R4 for the respective objects. The position data R1 to R4 include object ID "Obj1" to "Obj4", position "X1" to "X4", posture "106 1" to "Ω4", and time stamp "YYYYMMDDhhmmss" indicating the point of time when the position date is generated, respectively.

The global map is a data set that includes the position data as illustrated in FIG. 2 for physical objects present in the real space all over the service area $A_G$. For example, when one entire building is the service area $A_G$, the global map can include position data of not only the objects in one room illustrated in FIG. 2 but also objects in another room. The coordinate system of the position data of the global map is previously set in a fixed manner as a global coordinate system.

On the other hand, the local map is a data set that includes the position data as illustrated in FIG. 2 for physical objects present in the real space in the vicinity of the terminal device 100. For example, the local map can include position data of the objects B1 to B4 illustrated in FIG. 2. The position of the origin and the direction of the coordinate axis of the coordinate system of the local map depend on the position and the posture of the camera of the terminal device 100. Therefore, the coordinate system of the local map is generally different from the global coordinate system.

Note that objects whose positions can be represented by the global map or the local map are not limited to the example shown in FIG. 2. For example, position data of objects such as a building or a car located outdoors, instead of objects located indoors, may be included in the global map or the local map. In this case, the building may serve as a landmark.

2. CONFIGURATION OF MAP MANAGEMENT SERVER ACCORDING TO EMBODIMENT

Figure 3:
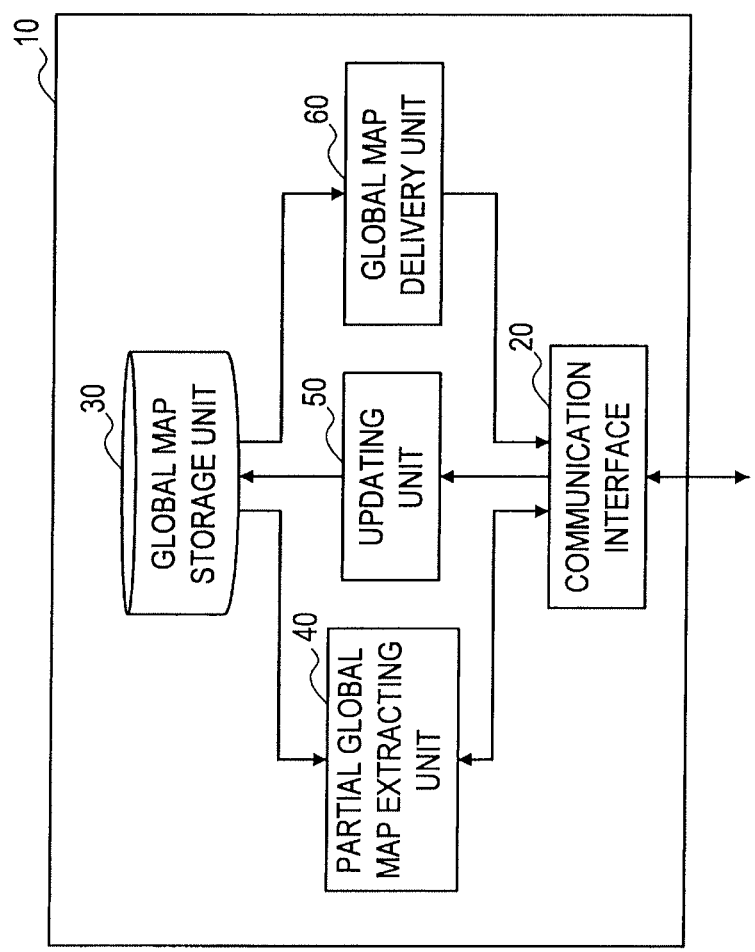
FIG. 3 is a block diagram illustrating an example of a configuration of a server according to an embodiment.

FIG. 3 is a block diagram illustrating an example of a configuration of the map management server 10 according to the embodiment. Referring to FIG. 3, the map management server 10 includes a communication interface 20, a global map storage unit 30, a partial global map extracting unit 40, an updating unit 50, and a global map delivery unit 60.

The communication interface 20 is an interface that mediates a communication connection between the map management server 10 and the terminal device 100. The communication interface 20 may be a wireless communication interface or a wired communication interface.

The global map storage unit 30 corresponds to a database that is constructed using a storage medium such as a hard disk or a semiconductor memory and stores the above-described global map representing positions of physical objects in the real space where a plurality of users are in activity. Then, the global map storage unit 30 outputs a partial global map, which is a subset of the global map, in response to a request from the partial global map extracting unit 40. Further, the global map stored in the global map storage unit 30 is updated by the updating unit 50. Further, the global map storage unit 30 outputs the whole or a requested part of the global map in response to a request from the global map delivery unit 60.

The partial global map extracting unit 40 receives information related to the position of the terminal device 100 through the communication interface 20 and extracts a partial global map according to the information. Then, the partial global map extracting unit 40 transmits the extracted partial global map to the terminal device 100 through the communication interface 20. The partial global map is a subset of the global map. The partial global map represents positions of physical objects located within a local area in the vicinity of the position of the terminal device 100 in the global coordinate system.

Figure 4:
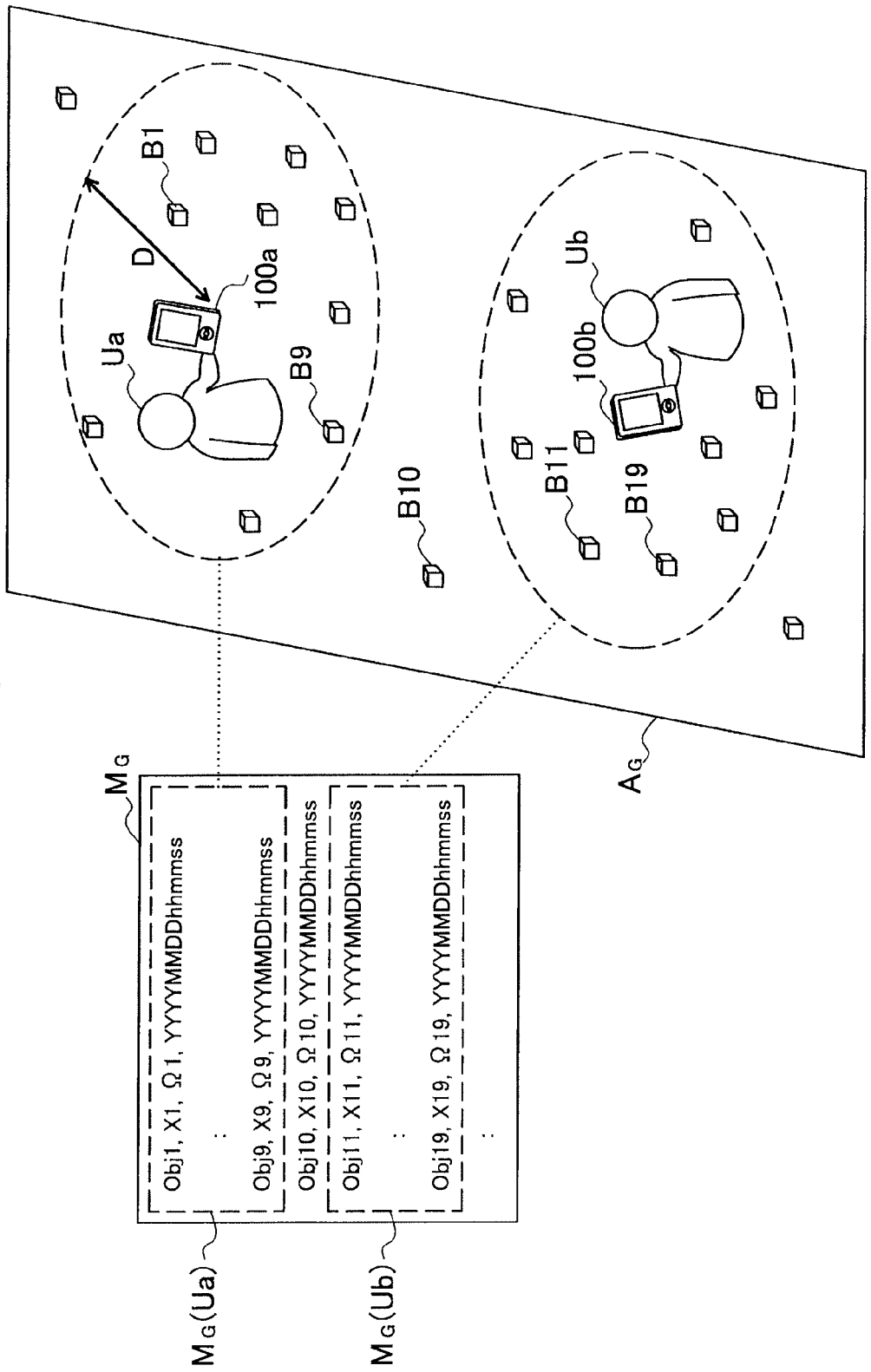
FIG. 4 is an illustrative diagram for illustrating a partial global map.

FIG. 4 is an illustrative diagram for illustrating the partial global map. A global map $M_G$ that contains position data of 19 objects with the object ID "Obj1" to "Obj19" is shown at the left of FIG. 4. The 19 objects are scattered in the service area $A_G$ shown at the right of FIG. 4. The objects whose distance from the position of the terminal device 100a possessed by the user Ua is a threshold D or less are objects B1 to B9. In this case, the position data of the objects B1 to B9 form a partial global map $M_G(Ua)$ for the user Ua, for example. Further, the objects whose distance from the position of the terminal device 100b possessed by the user Ub is the threshold D or less are objects B11 to B19. In this case, the position data of the objects B11 to B19 form a partial global map $M_G(Ub)$ for the user Ub, for example. The threshold D is set to an appropriate in advance so that a large part of the range of the local map described later is included in the partial global map. Note that another example about extraction of the partial global map is further described later.

The updating unit 50 updates the global map stored in the global map storage unit 30 based on position data of objects received from the terminal device 100 through the communication interface 20. A change in position of an object in the real space is thereby quickly reflected on the global map. A global map update process by the updating unit 50 is further described later.

The global map delivery unit 60 delivers the global map stored in the global map storage unit 30 to the terminal device 100 in response to a request from the the terminal device 100. The global map delivered from the global map delivery unit 60 is visualised on the screen of the terminal device 100 by a display function of the terminal device 100. A user can thereby view the latest global map (or the global map at a certain point of time in the past).

3. CONFIGURATION OF TERMINAL DEVICE ACCORDING TO EMBODIMENT

Figure 5:
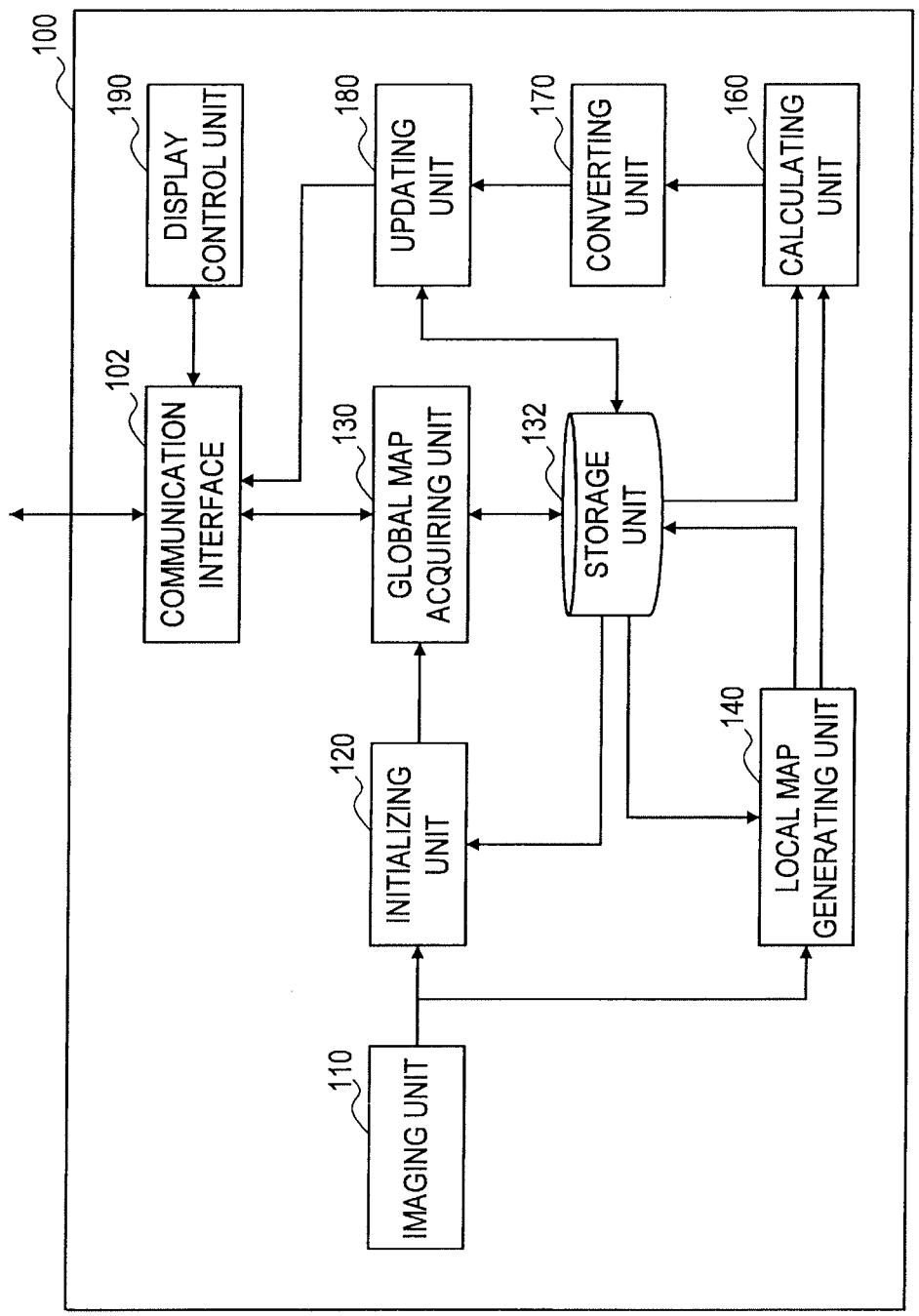
FIG. 5 is a block diagram illustrating an example of a configuration of a terminal device according to an embodiment.

FIG. 5 is a block diagram illustrating an example of & configuration of the terminal device 100 according to the embodiment. Referring to FIG. 5, the terminal device 100 includes a communication interface 102, an imaging unit 110, an initializing unit 120, a global map acquiring unit 130, a storage unit 132, a local map generating unit 140, a calculating unit 160, a converting unit 170, an updating unit 180, and a display control unit 190.

[3-1. Communication Interface]

The communication interlace 102 is an interface that mediates a communication connection between the terminal device 100 and the map management server 10. The communication interface 102 may be a wireless communication interface or a wired communication interface.

[3-2. Imaging Unit]

The imaging unit 110 may be realized as a camera having an imaging element such as a charge coupled device (CCD) or a complementary metal oxide semiconductor (CMOS), for example. The imaging unit 110 may be mounted externally to the terminal device 100. The imaging unit 110 outputs an image obtained by imaging the real space where physical objects are present as illustrated in FIG. 2 as an input image to the initializing unit 120 and the local map generating unit 140.

[3-3. Initializing Unit]

The initializing unit 120 localizes a rough position of the terminal device 100 in the global coordinate system by using the input image input from the imaging unit 110. Localization of the position of the terminal device 100 based on the input image may be performed according to the technique, disclosed in Japanese Patent Application Laid-Open No. 2008-185417, for example. In this case, the initializing unit 120 matches the input image against a reference image prestored in the storage unit 132 and sets a high score to the reference image with a high degree of matching. Then, the initializing unit 120 calculates a probability distribution of candidates for the position of the terminal device 100 based on the score and localizes the likely position (the position with the highest probability value in the hypothetical probability distribution) of the terminal device 100 based on the calculated probability distribution. Then, the initializing unit 120 outputs the localized position of the terminal device 100 to the global map acquiring unit 130.

Note that the initializing unit 120 may localize the position of the terminal device 100 by using a global positioning system (GPS) function instead of the technique described above. Further, the initializing unit 120 may localize the position of the terminal device 100 by using a technique such as PlaceEngine capable of measuring the current position based on field intensity information from a wireless access point in the vicinity, for example.

[3-4. Global Map Acquiring Unit]

The global map acquiring unit 130 transmits information related to the position of the terminal device 100 to the map management server 10 through the communication interface 102 and acquires the above-described partial global map extracted by the partial global map extracting unit 40 of the map management server 10. Then, the global map acquiring unit 130 stores the acquired partial global map into the storage unit 132.

Figure 6A:
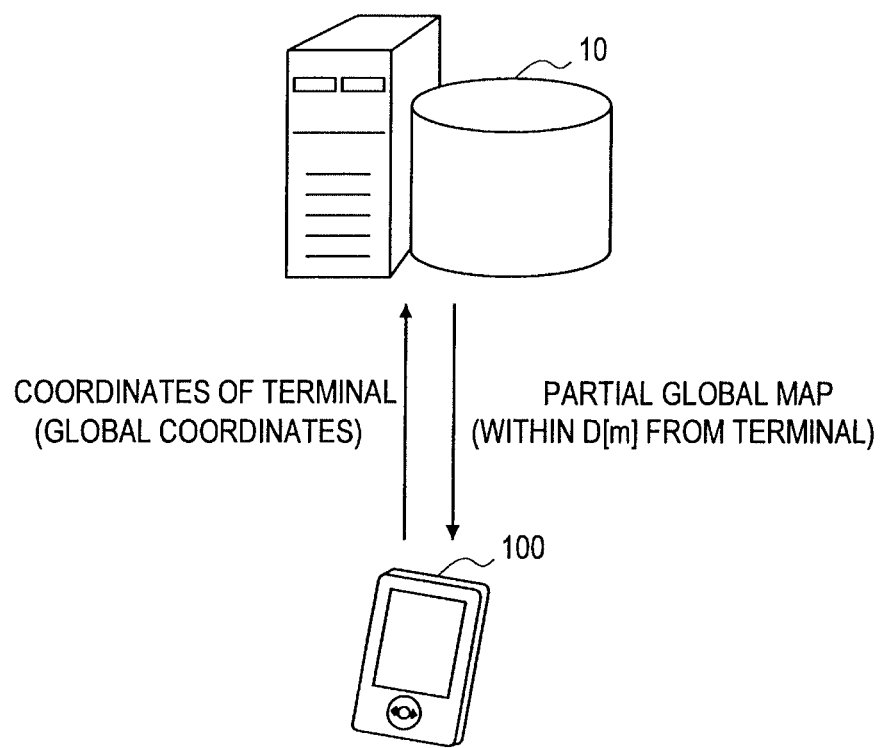
FIG. 6A is an illustrative diagram for illustrating a first example of a partial global map acquisition process.

FIG. 6A is an illustrative diagram for illustrating a first example of a partial global map acquisition process. Referring to FIG. 6A, the global map acquiring unit 130 of the terminal device 100 transmits position coordinates of the terminal device 100 in the global coordinate system to the map management server 10. Then, the partial global map extracting unit 40 of the map management server 10 extracts the partial global map formed by position data of objects located within a radius D[m] from the position coordinates, for example, and sends the extracted partial global map back to the terminal device 100. The global map acquiring unit 130 can thereby acquire the partial global map corresponding to the local area having a predefined width. The local area may be an area having a width which is directly observable by the imaging unit 110 of the terminal device 100, for example. This enables reduction of communication costs and processing costs of the terminal device 100 compared to the case of acquiring the whole global map.

Figure 6B:
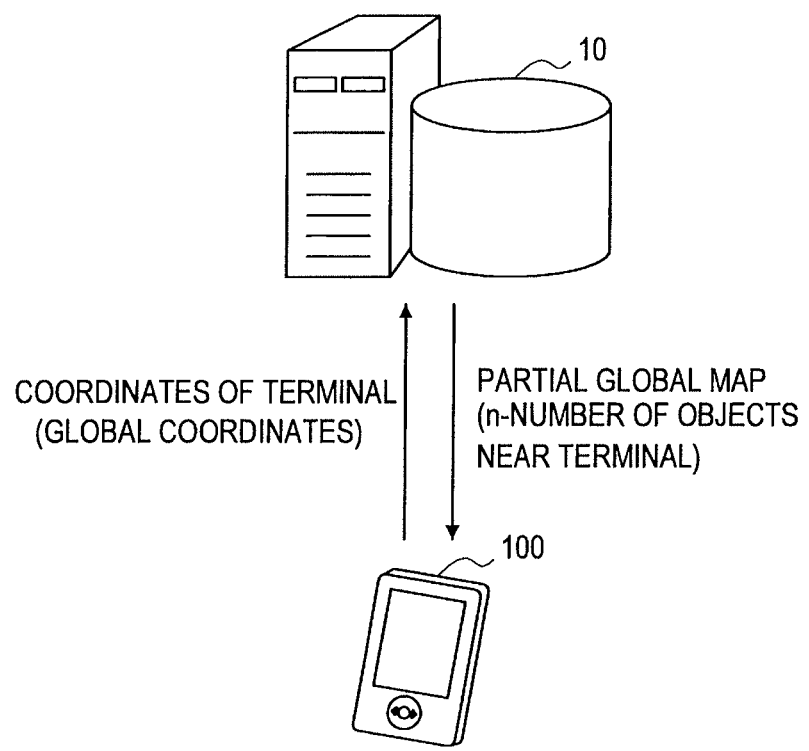
FIG. 6B is an illustrative diagram for illustrating a second example of a partial global map acquisition process.

FIG. 6B is an illustrative diagram for illustrating a second example of the partial global map acquisition process. Referring to FIG. 6B, the global map acquiring unit 130 of the terminal device 100 transmits position coordinates of the terminal device 100 in the global coordinate system to the map management server 10. Then, the partial global map extracting unit 40 of the map management server 10 extracts the partial global map formed by position data of n-number of objects in ascending order of the distance from the position coordinates, for example, and sends the extracted partial global map back to the terminal device 100. The global map acquiring unit 130 can thereby acquire the partial global map corresponding to the local area containing a predefined number of pieces of data. Generally, as the predefined number n of data is greater, matching of the partial global map against the local map by the calculating unit 160 to be described later can be made with higher accuracy. The value of n is determined in consideration of the balance between accuracy of the matching and communication costs and processing costs (for example, the value of n may be n=100).

Figure 6C:
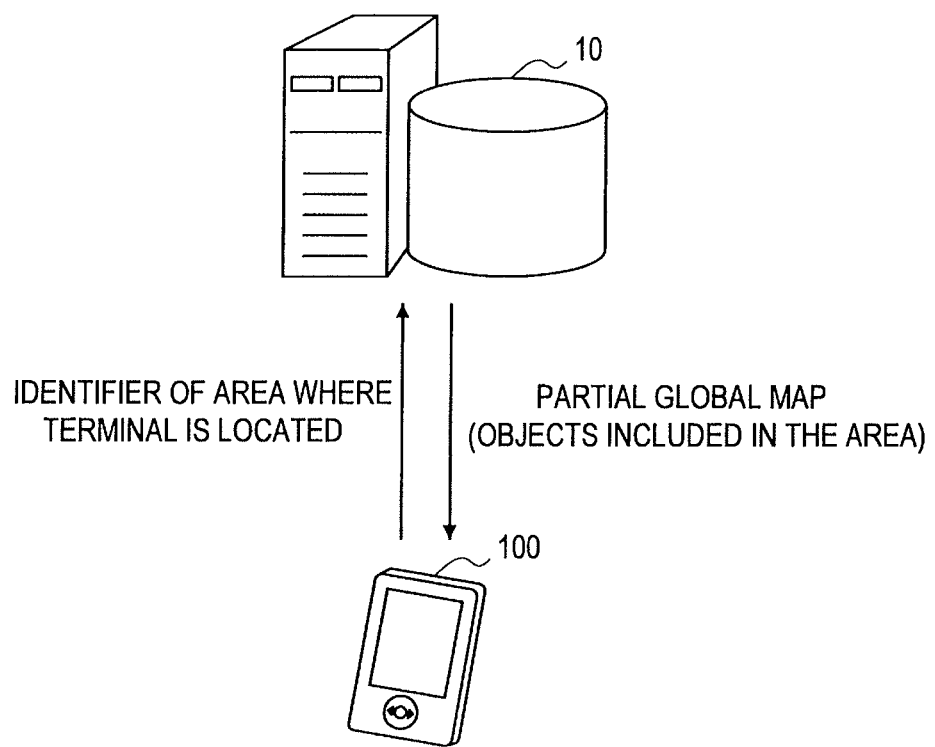
FIG. 6C is an illustrative diagram for illustrating a third example of a partial global map acquisition process.

FIG. 6C is an illustrative diagram for illustrating a third example of the partial global map acquisition process. Referring to FIG. 6C, the global map acquiring unit 130 of the terminal device 100 transmits an identifier (hereinafter referred to as an area identifier) for identifying an area where the terminal device 100 is located to the map management server 10. The area identifier may be an access point identifier of a wireless access point to which the terminal device 100 can access, for example. Further, when one whole building is the service area $A_G$, the area identifier may be a number identifying a floor or room where the terminal device 100 is located. Receiving the area identifier, the partial global map extracting unit 40 of the map management server 10 extracts the partial global map formed by position data of objects contained in the area indicated by the area identifier, and sends the extracted partial global map back to the terminal device 100. In this case also, compared to the case of acquiring the whole global map, communication costs and processing costs of the terminal device 100 can be reduced.

[3-5. Local Map Generating Unit]

The local map generating unit 140 generates the above-described local map that represents positions of nearby objects which are detectable by the terminal device 100 based on an input image input from the imaging unit 110 and feature data, which is described later, stored in the storage unit 132. FIG. 7 is a block diagram illustrating an example of a detailed configuration of the local map generating unit 140 according to the embodiment. Referring to FIG. 7, the local map generating unit 140 includes a self-position detecting unit 142, an Image recognizing unit 144 and a local map building unit 146.

(1) Self-Position Detecting Unit

The self-position detecting unit 142 dynamically detects a position of a camera, which takes input image, based on an input image input from the imaging unit 110 and feature data stored in the storage unit 132. For example, even when the camera of the imaging unit 110 is a monocular camera, the sell-position detecting unit 142 may dynamically determine a position and a posture of the camera and a position of a feature point on an imaging plane of the camera for each frame by applying the SLAM technology disclosed in "Real-Time Simultaneous Localization and Mapping with a Single Camera" (Andrew J. Davison, Proceedings of the 9th IEEE International Conference on Computer Vision Volume 2, 2003, pp. 1403-1410).

First, the entire flow of a self-position detection process by the self-position detecting unit 142 using the SLAM technology is described with reference to FIG. 8. Next, the sell-position detection process is described in detail with reference to FIGS. 9 to 11.

FIG. 8 is a flowchart illustrating, an example of the flow of the self-position detection process by the self-position detecting unit 142 using the SLAM technology. In FIG. 8, when the self-position detection process starts, the self-position detecting unit 142 first initializes a state variable (step S102). In this embodiment, the state variable is a vector including a position and a posture (rotation angle) of the camera, a moving speed and an angular speed of the camera, and a position of one or more feature points as elements. The self-position detecting unit 142 then sequentially obtains the input image from the imaging unit 110 (step S112). The processes from the step 112 to the step S118 may be repeated for each input image (that is, each frame).

At the step S114, the self-position detecting unit 142 tracks feature points present in the input image. For example, the self-position defecting unit 142 detects a patch (small image of 3×3=9 pixels around a feature point for example) of each feature point stored in advance in the storage unit 132 from the input image. The position of the patch herein detected, that is, the position of the feature point is used later when updating the state variable.

At the step S116, the sell-position detecting unit 142 generates a predicted value of the state variable of next frame, for example, based on a predetermined prediction model. Also, at the step S118, the self-position detecting unit 142 updates the state variable using the predicted value of the state variable generated at the step S116 and an observed value according to the position of the feature point detected at the step S114. The self-position detecting unit 142 executes the processes at the steps S116 and S118 based on a principle of an extended Kalman filter.

As a result of such process, a value of the state variable updated for each frame is output. Configuration of each process of tracking of the feature point (step S114), prediction of the state variable (step S116) and updating of the state variable (step S118) are hereinafter described more specifically.

(1-1) Tracking of Feature Point

In this embodiment, the storage unit 132 stores in advance the feature data indicating features of objects corresponding to physical objects which may be present in the real space. The feature data includes small images, that is, the patches regarding one or more feature points, each representing the feature of appearance of each object, for example. The patch may be the small image composed of 3×3=9 pixels around the feature point, for example.

FIG. 9 illustrates two examples of the objects and an example of feature points (FPs) and patches set on each object. A left object in FIG. 9 is the object representing a PC (refer to FIG. 5*a*). A plurality of feature points including a feature point FP1 are set on the object. Further, a patch Pth1 is defined in relation to the feature point FP1. On the other hand, a right object in FIG. 9 is the object representing a calendar (refer to FIG. 9*b*). A plurality of feature points including a feature point FP2 are set on the object. Further, a patch Pth2 is defined in relation to the feature point FP2.

Upon obtaining an input image from the imaging unit 110, the self-position detecting unit 142 matches partial images included in the input image against the patch for each feature point illustrated in FIG. 9 stored in advance in the storage unit 132. The self-position detecting unit 142 then specifies a position of each feature point included in the input image (a position of a center pixel of the detected patch, for example) as a result of the matching.

It should be noted that, for tracking feature points (step S114 in FIG. 8), it is not necessary to store data regarding all of the feature points to be tracked in the storage unit 132 in advance. For example, four feature points are detected in the input image at time T=t−1 in an example illustrated in FIG. 10 (refer to FIG. 10*a*). Next, when the position or the posture of the camera changes at time T=t, only two of the tour feature points present in the input image at the time T=t−1 are present in the input image. In this case, the self-position detecting unit 142 may newly set feature points at positions where a characteristic pixel pattern of the input image is present and use the new feature points in the self-position detection process for a subsequent frame. For example, in the example illustrated in FIG. 10, three new feature points are set on the object at the time T=t (refer to FIG. 10*b*). This is a feature of the SLAM technology, and according to this, a cost of setting all of the feature points in advance may be reduced and accuracy of the process may be improved using the increased number of feature points.

(1-2) Prediction of State Variable

In this embodiment, the self-position detecting unit 142 uses a state variable X expressed in the following equation as the state variable to be applied for the extended Kalman filter.

[Equation 1]

$$X = \begin{pmatrix} x \\ \omega \\ \dot{x} \\ \dot{\omega} \\ p_1 \\ \vdots \\ p_N \end{pmatrix} \quad (1)$$

The first element of the state variable X in the equation (1) represents a three-dimensional position of the camera in a local map coordinate system (x, y, z) which is set for each terminal device 100. Note that the local map coordinate system is set according to the position and the posture of the camera of the imaging unit 110 in the initialization process, for example. The origin of the local map coordinate system may be at the position of the camera in the initialization process, for example.

[Equation 2]

$$x = \begin{pmatrix} x_c \\ y_c \\ z_c \end{pmatrix} \quad (2)$$

Also, the second element of the state variable is a four-dimensional vector to having a quaternion as an element corresponding to a rotation matrix representing the posture of the camera. Note that, the posture of the camera may be represented using an Euler angle in place of the quaternion. Also, the third and the fourth elements of the state variable represent the moving speed and the angular speed of the camera, respectively.

Further, the fifth and subsequent elements of the state variable represent a three-dimensional position $p_i$ of a feature point $FP_i$ (i=1 . . . N) in the local map coordinate system as expressed in a following equation. Note that, as described above, the number N of the feature points may change during the process.

[Equation 3]

$$p_i = \begin{pmatrix} x_i \\ y_i \\ z_i \end{pmatrix} \quad (3)$$

The self-position detecting unit 142 generates the predicted value of the state variable for the latest frame based on the value of the state variable X initialized at the step S102 or the value of the state variable X updated in the previous frame. The predicted value of the state variable is generated according to a state equation of the extended Kalman filter according to multidimensional normal distribution as shown in the following equation.

[Equation 4]

Predicted state variable $\hat{X}=F(X,a)+w$ (4)

Herein, F represents the prediction model regarding state transition of a system and "a" represents a prediction condition. Also, w represents Gaussian noise and may include a model approximation error, an observation error and the like, for example. In general, an average of the Gaussian noise w is 0.

FIG. 11 is an illustrative diagram for illustrating an example of the prediction model according to this embodiment. With reference to FIG. 11, two prediction conditions in the prediction model according to this embodiment are illustrated. First, as a first condition, suppose that the three-dimensional position of the feature point in the local map coordinate system does not change. That is, provided that the three-dimensional position of the feature point FP1 at the time T is $p_T$, the following relationship is satisfied.

[Equation 5]

$p_t=p_{t-1}$ (5)

Next, as a second condition, suppose that motion of the camera is uniform motion. That is, a following relationship is satisfied for the speed and the angular speed of the camera from the time T=t−1 to the time T=t.

[Equation 6]

$\dot{x}_t=\dot{x}_{t-1}$ (6)

$\dot{\omega}_t=\dot{\omega}_{t-1}$ (7)

The self-position detecting unit 142 generates the predicted value of the state variable for the latest frame based on such prediction model and the state equation expressed in the equation (4).

(1-3) Updating of State Variable

The self-position detecting unit 142 then evaluates an error between observation information predicted from the predicted value of the state variable and actual observation information obtained as a result of feature point tracking, using an observation equation, for example. Note that, v in the equation (8) is the error.

[Equation 7]

Observation information $s=H(\hat{X})+v$ (8)

Predicted observation information $\hat{s}=H(\hat{X})$ (9)

Herein, H represents an observation model. For example, a position of the feature point $FP_i$ on the imaging plane (u-v plane) is defined as expressed in a following equation.

[Equation 8]

Position of $FP_i$ on imaging plane $$\tilde{p}_i = \begin{pmatrix} u_i \\ v_i \\ 1 \end{pmatrix} \quad (10)$$

Herein, all of the position of the camera x, the posture of the camera ω and the three-dimensional position $p_i$ of the feature point $FP_i$ are given as the elements of the state variable X. Then, the position of the feature point $FP_i$ on the imaging plane is derived using a following equation according to a pinhole model.

[Equation 9]

$\lambda\tilde{p}_i=AR_\omega(p_i-x)$ (11)

Herein, λ represents a parameter for normalization. A represents a camera internal parameter, $R_\omega$ represents the rotation matrix corresponding to the quaternion ω representing the posture of the camera included in the state variable X. The camera internal parameter A is given in advance as expressed in the following equation according to characteristics of the camera, which takes the input image.

[Equation 10]

$$A = \begin{pmatrix} -f \cdot k_u & f \cdot k_u \cdot \cot\theta & u_o \\ 0 & -\dfrac{f \cdot k_v}{\sin\theta} & v_o \\ 0 & 0 & 1 \end{pmatrix} \quad (12)$$

Herein, f represents focal distance, θ represents orthogonality of an image axis (ideal value is 90 degrees), $k_u$ represents a scale along a longitudinal axis of the imaging plane (rate of change of scale from the local map coordinate system to the coordinate system of the imaging plane), $k_v$ represents a scale along an abscissa axis of the imaging plane, and ($u_o$, $v_o$) represents a center position of the imaging plane.

Therefore, a feasible latest state variable X may be obtained by searching the state variable X, which makes the error between the predicted observation information derived using the equation (11), that is, the position of each feature point on the imaging plane and the result of feature point tracking at the step S114 in FIG. 8 minimum.

[Equation 11]

Latest state variable $X \leftarrow \hat{X} + \text{Innov}(s - \hat{s})$ (13)

The self-position detecting unit 142 outputs the position x and the posture ω of the camera dynamically updated by applying the SLAM technology in this manner to the local map building unit 146.

(2) Feature Data

The storage unit 132 stores in advance the feature data indicating features of objects corresponding to physical objects which may be present in the real space. FIG. 12 is an illustrative diagram for illustrating an example of a configuration of feature data.

Referring to FIG. 12, feature data FD1 as an example of the object B2 is illustrated. The feature data FD1 includes an object name FD11, image data FD12 taken from six directions, patch data FD13, three-dimensional shape data FD14, and ontology data FD15.

The object name FD11 is a name that can specify a corresponding object, such as "coffee cup A".

The image data FD12 includes six Image data obtained by taking images of the corresponding object from six directions (front, back, left, right, above and below), for example. The patch data FD13 is a set of small images around each feature point for each of one or more feature points set on each object. Use image data FD12 and the patch data FD13 may be used for an object recognition process by the image recognizing unit 144 to be described later. Also, the patch data FD13 may be used for the above-described self-position detection process by the self-position detecting unit 142.

The three-dimensional shape data FD14 includes polygon information for recognizing a shape of the corresponding object and three-dimensional positional information of feature points. The three-dimensional shape data FD14 may be used for a local map build process by the local map building unit 146 to be described later.

The ontology data FD15 is the data, which may be used to assist the local map build process by the local map building unit 146, for example. In the example illustrated in FIG. 12, the ontology data FD15 indicates that the object B2, which is the coffee cup, is likely to come in contact with an object corresponding to a table and is unlikely to come in contact with an object corresponding to a bookshelf.

(3) Image Recognizing Unit

The image recognizing unit 144 specifies to which object each of the objects present on the input image corresponds by using the above-described feature data stored in the storage unit 132.

Figure 13:
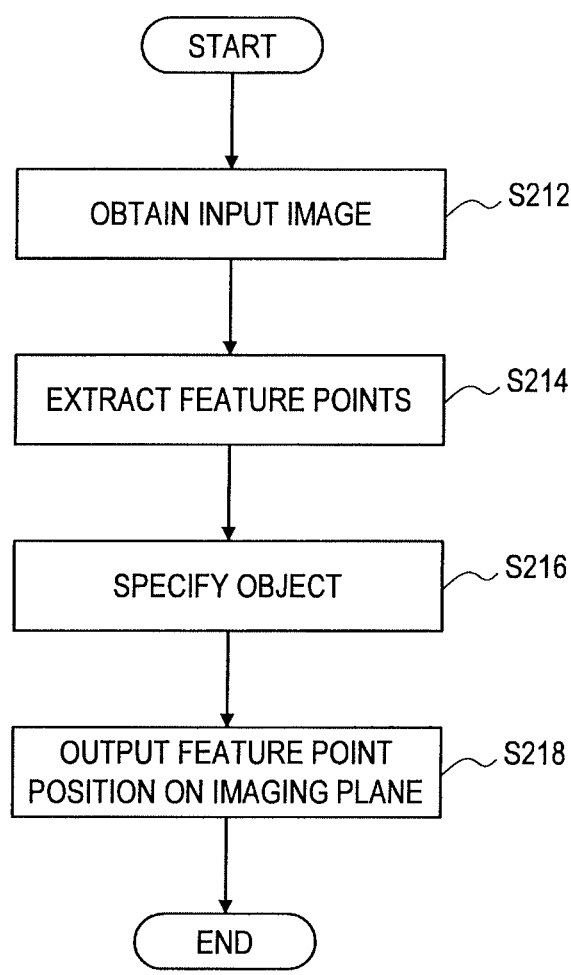
FIG. 13 is a flowchart illustrating an example of a flow of an object recognition process according to an embodiment.

FIG. 13 is a flowchart illustrating an example of flow of the object recognition process by the image recognizing unit 144. Referring to FIG. 13, the image recognizing unit 144 first obtains the input image from the imaging unit 110 (step S212). Next, the image recognizing unit 144 matches partial images included in the input image against patches of one or more feature points of each object included in the feature data to extract feature points included in the input image (step S214). It should be noted that the feature points used in the object recognition process by the image recognizing unit 144 and the feature points used in the self-position detection process by the self-position detecting unit 142 are not necessarily the same. However, when common feature points are used in the both processes, the image recognizing unit 144 may reuse the result of feature point tracking by the self-position detecting unit 142.

Next, the image recognizing unit 144 specifies the object present in the input image based on an extraction result of the feature point (step S216). For example, when the feature points belonging to one object are extracted with high density in a certain area, the image recognizing unit 144 may recognize that the object is present in the area. The image recognizing unit 144 then outputs the object name (or identifier) of the specified object and the position of the feature point belonging to the object on the imaging plane to the local map building unit 146 (step S218).

(4) Local Map Building Unit

The local map building unit 146 generates the local map using the position and the posture of the camera input from the self-position detecting unit 142, the positions of the feature points on the imaging plane input from the image recognizing unit 144 and the feature data stored its the storage unit 132. In this embodiment, the local map is a set of position data indicating positions and postures of one or more objects present in the vicinity of the terminal device 100 using the local map coordinate system. Further, the respective position data included in the local map may be associated with object names corresponding to objects, the three-dimensional positions of feature points belonging to the objects, and the polygon information configuring shapes of the objects, for example. The local map may be built by obtaining the three-dimensional position of each feature point according to the above-described pinhole model from the position of the feature point on the imaging plane input from the image recognizing unit 144, for example.

By deforming the relation equation of the pinhole model expressed in the equation (11), the three-dimensional position $p_i$ of the feature point $FP_i$ in the local map coordinate system may be obtained by a following equation.

[Equation 12]

$$p_i = x + \lambda \cdot R_\omega^T \cdot A^{-1} \cdot \tilde{p}_i = x + d \cdot R_\omega^T \frac{A^{-1} \cdot \tilde{p}_i}{\|A^{-1} \cdot \tilde{p}_i\|} \quad (14)$$

Herein, d represents distance between the camera and each feature point in the local map coordinate system. The local map building unit 146 may calculate such distance d based on the positions of at least four feature points on the imaging plane and the distance between the feature points for each object. The distance between the feature points is stored in advance in the storage unit 132 as the three-dimensional shape data FD14 included in the feature data illustrated with reference to FIG. 12. It should be noted that, a calculation process of the distance d in the equation (14) is disclosed in detail in Japanese Patent Application Laid-Open No. 2008-304268.

After the distance d is calculated, remaining variables of a right side of the equation (14) are the position and the posture of the camera input from the self-position detecting unit 142 and the position of the feature point on the imaging plane input from the image recognizing unit 144, and all of which are known. The local map building unit 146 then calculates the three-dimensional position in the local map coordinate system for each feature point input from the image recognizing unit 144 according to the equation (14). The local map building unit 146 then builds a latest local map according to the three-dimensional position of each calculated feature point. It should be noted that, at that time, the local map building unit 146 may improve accuracy of the data of the local map using the ontology data FD15 included in the feature data illustrated with reference to FIG. 12. Then, the local map building unit 146 stores the built local map into the storage unit 132 and outputs the local map to the calculating unit 160.

It should be noted that the case where the local map generating unit 140 generates the local map by using the image (such as the patch for each feature point of the object) included in the feature data is described above. However, when an identifying means such as a marker or a tag for identifying each object is provided in advance to the object, the local map generating unit 140 may identify each object using the identifying means and generate the local map using the identification result. As the identifying means for identifying each object, a barcode, QR code (registered trademark), an RF (Radio Frequency) tag and the like may be used, for example.

[3-6. Calculating Unit]

The calculating unit 160 matches the position data of objects included in the partial global map against the position data of objects included in the local map and, based on a result of the matching, calculates the relative position and posture of the local map relative to the global map. The relative position and posture of the local map to the partial global map correspond to the displacement and slope of the local map coordinate system with reference to the global coordinate system. Specifically, the calculating unit 160 may calculate the relative position and posture of the local map based on the position data of the landmark included in common in the partial global map and the local map, for example. Alternatively, the calculating unit 160 may calculate the relative position and posture of the local map so that, when the position data of objects included in the local map is converted into data of the global coordinate system, a difference between the converted data and the position data of objects included in the partial global map becomes small as a whole, for example. Then, the calculating unit 160 outputs the calculated relative position and posture of the local map and the local map to the converting unit 170.

(First Technique)

FIG. 14A is an illustrative diagram for illustrating an example of a map matching process by the calculating unit 160 according to the embodiment.

FIG. 14A schematically shows a partial global map $M_G$ (Ua) stored in the storage unit 132 and a local map $M_{La}$ generated by the local map generating unit 140. The partial global map $M_G$ (Ua) includes nine objects represented by cubes. Further, the local map $M_{La}$ includes four objects represented by spheres. Of those objects, objects B1, B2(B2'), B3 and B4 are included in common in the partial global map $M_G$ (Ua) and the local map $M_{La}$. The objects B1, B3 and B4 are immobile objects which hardly move, that are landmarks. The calculating unit 160 thus calculates a position and a posture of the local map in such a way that, when the position data of the objects B1, B3 and B4 of the local map is converted into data of the global coordinate system, the converted data and the position data of the objects B1, B3 and B4 included in the partial global map coincide with each other, for example.

First, the calculating unit 160 extracts three pairs of landmarks (or feature points on the landmarks) common to the partial global map $M_G$ (Ua) and the local map $M_{La}$. For the three pairs of landmarks, a three-dimensional position in the local map coordinate system is $w_i$ (i=1, 2, 3), and a three-dimensional position in the global coordinate system is $X_i$. Further, when a displacement of the local map coordinate system with reference to the global coordinate system is $\Delta X$, and a rotation matrix corresponding to a slope $\Delta \Omega$ of the local map coordinate system is $R_L$, the following equations are established.

[Equation 13]

$$X_1 = R_L \cdot w_1 + \Delta X$$

$$X_2 = R_L \cdot w_2 + \Delta X$$

$$X_3 = R_L \cdot w_3 + \Delta X \tag{15}$$

The rotation matrix $R_L$ may be obtained by altering the equation (15) into the following equation (16).

[Equation 14]

$$X_1 - X_3 = R_L \cdot (w_1 - w_3)$$

$$X_2 - X_3 = R_L \cdot (w_2 - w_3)$$

$$(X_1 - X_3) \times (X_2 - X_3) = R_L \{(w_1 - w_3) \times (w_2 - w_3)\} \tag{16}$$

It should be noted that, in the case of representing the rotation of the local map coordinate system using a quaternion, instead the rotation matrix $R_L$, as well, a quaternion representing a rotation (and a rotation matrix corresponding to the quaternion) may be calculated using that the norm of the quaternion indicating the rotation is 1.

Further, the calculating unit 160 can calculate the displacement $\Delta X$ of the local map coordinate system by solving the equations (15).

Note that, in the example of FIG. 14A, the position of the object B2, which is not a landmark, in the partial global map $M_G$ (Ua) and the position (B2') in the local map $M_{La}$ are different. This means that the object B2 has moved during a period from the latest update time of the partial global map $M_G$ (Ua) to the generation time of the local map $M_{La}$.

(Second Technique)

Figure 14B:
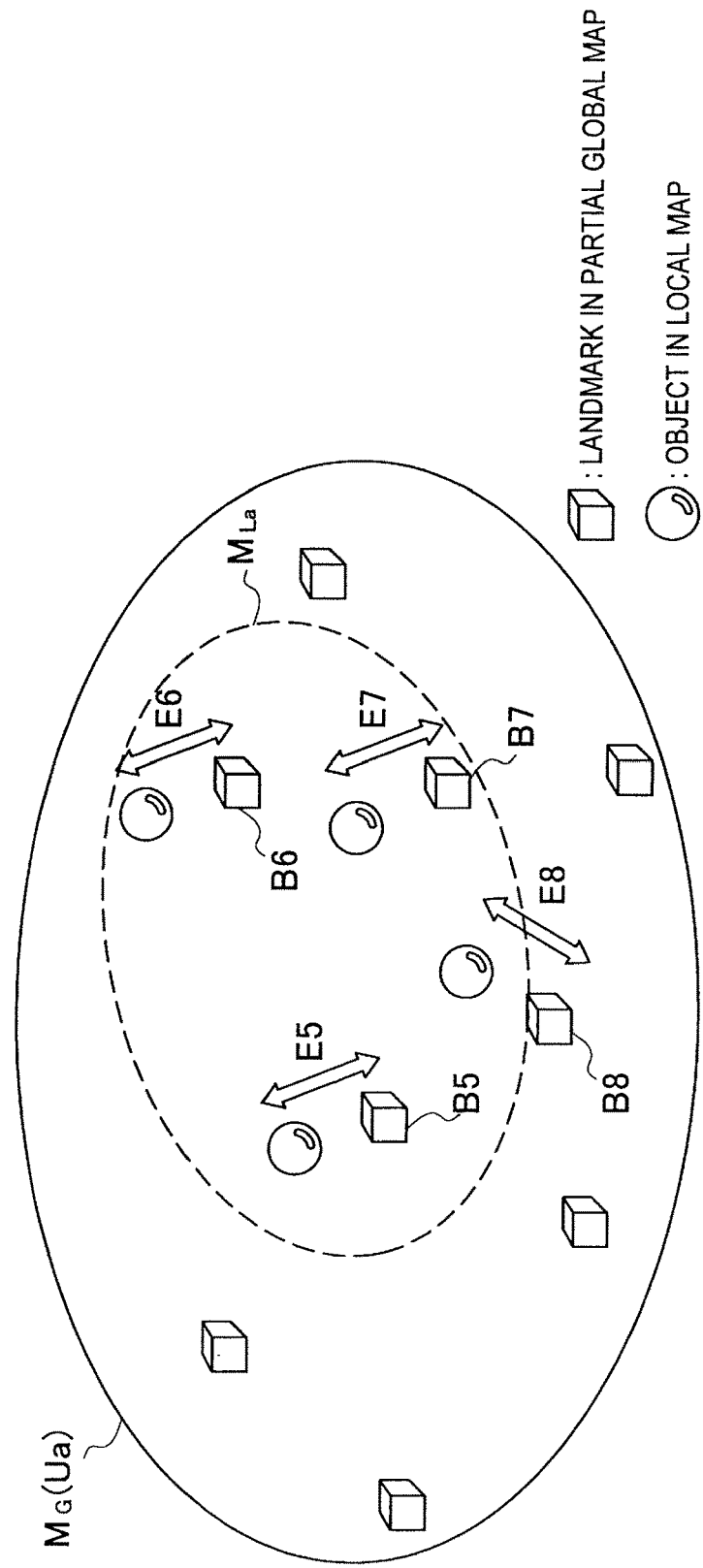
FIG. 14B is an illustrative diagram for illustrating another example of a map matching process by a calculating unit according to an embodiment.

FIG. 14B is an illustrative diagram for illustrating another example of the map matching process by the calculating unit 160 according to the embodiment.

FIG. 14B schematically shows a partial global map $M_G$ (Ua) stored in the storage unit 132 and a local map $M_{La}$ generated by the local map generating unit 140. The partial global map $M_{La}$ (Ua) includes nine objects represented by cubes. Further, the local map $M_{La}$ includes four objects represented by spheres. Of those objects, objects B5, B6, B7 and B8 are included in common in the partial global map $M_G$ (Ua) and the local map $M_{La}$. The calculating unit 160 may thus calculate the position (the displacement ΔX of the local map coordinate system) and the posture (the slope ΔΩ of the local map coordinate system) of the local map in such a way that, when the position data of the objects B5 to B8 is converted into data of the global coordinate system, the total sum of differences between the converted data and the position data of the objects B5 to B8 (e.g. the sum of distances E5, E6, E7 and E8 in the example of FIG. 14A) is small, for example. For example, the calculating unit 160 may calculate the likely position and posture of the local map at which the above-described total sum of differences is small by applying known RANdom Sample Consensus (RANSAC) algorithm.

The RANSAC algorithm is generally an algorithm that, for a plurality of points whose three-dimensional positions are known, decides a line or a plane containing the plurality of points within a preset range of error. In this embodiment, the calculating unit 160 first prepares a plurality of (suitably, four or more) pairs of objects (or feature points on objects) which are common to the partial global map $M_G$ (Ua) and the local map $M_{La}$. Next, the calculating unit 160 extracts three pairs from the prepared plurality of pairs at random. Then, the calculating unit 160 derives candidates for the displacement ΔX of the local map coordinate system and the rotation matrix $R_L$ corresponding to the slope ΔΩ of the local map coordinate system by solving the above-described equations (15). Then, the calculating unit 160 evaluates the derived candidates using the following evaluation formula.

[Equation 15]

$$\varepsilon_j \| X_j - (R_L \cdot w_j + \Delta X) \| \quad (17)$$

Note that, in the equation (17), j indicates each of objects (or feature points on objects). The calculating unit 160 counts the number of j which makes an evaluation value $\varepsilon_j$ in the equation (17) smaller than a predetermined threshold. Then, the calculating unit 160 decides the displacement ΔX and the rotation matrix $R_L$ by which the count result is the greatest as the likely position and posture of the local map.

(Combination of First Technique and Second Technique)

Further, the calculating unit 160 may use both the first technique and the second technique described above as appropriate according to the number of landmarks included in the local map, for example. For example, the relative position and posture of the local map may be calculated using the technique described with reference to FIG. 14A when three landmarks are included in the local map and calculated using the technique described with reference to FIG. 14B when two or less landmarks are included in the local map.

[3-7. Converting Unit]

The converting unit 170 performs coordinate conversion of position data of objects included in the local map into data of the global map coordinate system according to the relative position and posture of the local map input from the calculating unit 160. Specifically, the converting unit 170 rotates the three-dimensional position of objects included in the local map (local map coordinate system) using the rotation matrix corresponding to the slope ΔΩ of the local map input from the calculating unit 160. Then, the converting unit 170 adds the relative position (the displacement ΔX of the local map coordinate system with respect to the global coordinate system) of the local map input from the calculating unit 160 to the coordinates after rotation. The position data of objects included in the local map is thereby converted into data of the global map coordinate system. The converting unit 170 outputs the position data of objects included in the local map after the coordinate conversion to the updating unit 180.

Further, the converting unit 170 may perform coordinate conversion of the position and posture of the camera of the local map coordinate system detected by the self-position detecting unit 142 of the local map generating unit 140 into data of the global map coordinate system using the relative position and posture of the local map input from the calculating unit 160. The position of the terminal device 100 which is specified by the initializing unit 120 can be thereby updated according to movement of the terminal device 100 after initialization. After that, the global map acquiring unit 130 may acquire a new partial global map from the map management server 10 according to the new updated position of the terminal device 100.

[3-8. Updating Unit]

The updating unit 180 updates the partial global map stored in the storage unit 132 by using the position data of objects included in the local map after the coordinate conversion by the converting unit 170. Further, the updating unit 180 transmits; the local map after the coordinate conversion by the converting unit 170 or the updated partial global map to the map management server 10, thereby updating the global map stored in the map management server 10. The update of the global map can be finally performed by the updating unit 50 of the map management server 10 which has received the local map after the coordinate conversion or the global map after the update from the updating unit 180 of the terminal device 100.

FIG. 15A is an illustrative diagram for illustrating an example of a global map update process according to the embodiment.

FIG. 15A schematically shows a partial global map $M_G$ (Ua) before update and a local map $M_{La}$' after coordinate conversion. The partial global map $M_G$ (Ua) before update includes position data of nine objects (Obj1 to Obj9). The time stamp of those position data indicates 2010/1/1 23:59:59 as an example. The local map $M_{La}$' after coordinate conversion includes position data of five objects (Obj1 to Obj4). The time stamp of those position data indicates 2010/1/2 12:00:00 as an example. In this case, the updating unit 180 updates the position data of the partial global map $M_G$ (Ua) to the position data of the more recent local map $M_{La}$' after coordinate conversion for each of the common objects (Obj1 to Obj4). Further, the updating unit 180 inserts position data of a new object (Obj10) into the partial global map $M_G$ (Ua). As a result, a new partial global map $M_G$ (Ua)' is generated.

Note that, although the position data of common objects are updated by new data in the example of FIG. 15A, old position data and new position data of the common objects may coexist instead. This enables extraction by filtering not only the latest global map but also the past global map with time. In this case, the old position data may be deleted after a certain period of time has elapsed by periodic processing, for example.

FIG. 15B is an illustrative diagram for illustrating another example of a global map update process according to the embodiment.

FIG. 15B schematically shows a partial global map $M_G$ (Ua) before update and a local map $M_{La}$ after coordinate conversion. The partial global map $M_G$ (Ua) before update includes seven objects including objects B1 to B3. On the other hand, the local map $M_{La}'$ after coordinate conversion includes four objects B1 to B3 and B12. In this case, the updating unit 180 deletes objects in the partial global map $M_G$ (Ua) before update which are included in an area corresponding to the local map $M_{La}'$ after coordinate conversion (the area indicated by a dotted line in FIG. 15B, for example), and inserts the objects in the local map $M_{La}'$ after coordinate conversion which are included in this area into the partial global map $M_G$ (Ua). As a result, a new partial global map $M_G$ (Ua)' as shown at the bottom of FIG. 15B is generated. According to such update process, it is possible to appropriately reflect movement of a plurality of objects which are difficult to be distinguished by image recognition, such as a plurality of objects having the same appearance, on the global map.

Note that, in the example of FIG. 15B also, old position data and new position data may coexist in one map. Further, because objects serving as landmarks among the objects included in the partial global map do not usually move, the updating unit 180 may skip the update process for the position data of the landmarks.

The above description with reference to FIGS. 15A and 15B is also applicable in the same manner to update of the global map by the updating unit 50 of the map management server 10, not only update of the partial global map by the updating unit 180 of the terminal device 100. In this case, the partial global map in FIGS. 15A and 15B corresponds to the global map stored in the global map storage unit 30, and the local map after coordinate conversion in FIGS. 14A and 15B corresponds to the partial global map (or the local map after coordinate conversion) transmitted from the terminal device 100 to the map management server 10.

[3-9. Display Control Unit]

The display control unit 190 downloads the global map from the map management server 10 in response to an instruction from a user, visualizes the global map at least partially, and outputs it to a screen of the terminal device 100. Specifically, when the display control unit 190 detects input of an instruction from a user, for example, the display control unit 190 transmits a request for transmission of the global map to the global map delivery unit 60 of the map management server 10. Then, the global map stored in the global map storage unit 30 is delivered from the global map delivery unit 60 of the map management server 10. The display control unit 190 receives the global map, visualizes the positions of objects in an area desired by a user (which may be an area different from the area where a user is currently located), and outputs it to the screen.

4. FLOW OF PROCESS

FIG. 16 is a flowchart illustrating an example of a flow of a map update process between the map management server 10 and the terminal device 100 according to the embodiment.

Referring to FIG. 16, the initializing unit 120 of the terminal device 100 first initializes the position of the terminal device 100 in the global coordinate system by using an input image input from the imaging unit 110 (step S302). The initialization process by the initializing unit 120 may be performed at the startup of the terminal device 100, at the startup of a given application in the terminal device 100 and the like, for example.

Next, the global map acquiring unit 130 of the terminal device 100 transmits information related to the position of the terminal device 100 in the global coordinate system to the map management server 10 (step S304). The information related to the position of the terminal device 100 may be coordinates of the terminal device 100 in the global coordinate system or may alternatively be an area identifier for identifying the area where the terminal device 100 is located.

Then, the partial global map extracting unit 40 of the map management server 10 extracts the partial global map for the terminal device 100, which is a subset of the global map stored in the global map storage unit 30 (step S306).

The partial global map extracting unit 40 of the map management server 10 then transmits the partial global map for the terminal device 100 to the global map acquiring unit 130 of the terminal device 100 (step S308).

Then, the local map generating unit 140 of the terminal device 100 generates the local map representing positions of nearby objects based on an input image and feature data (step S310).

After that, the calculating unit 160 of the terminal device 100 calculates the relative position and posture of the local map on the basis of the global coordinate system based on the position data of objects included in the partial global map and the position data of objects included in the local map (step S312). Then, according to the relative position and posture of the local map calculated by the calculating unit 160, the converting unit 170 performs coordinate conversion of the position data of objects included in the local map into data of the global coordinate system.

Then, the updating unit 180 of the terminal device 100 updates the partial global map stored in the storage unit 132 of the terminal device 100 by using the position data of objects included in the local map after coordinate conversion. Further, the updating unit 180 updates the position of the terminal device 100 in the global coordinate system (step S314).

Then, the updating unit 180 of the terminal device 100 transmits the updated partial global map to the updating unit 50 of the map management server 10 (step S316). The updating unit 50 of the map management server 10 then updates the global map stored in the global map storage unit 30 by using the position data of objects included in the updated partial global map (step S318).

After that, the process from the generation of the local map (step S310) to the update of the global map (step S318) is repeated on a regular basis or in response to a request. Further, when the position of the terminal device 100 becomes apart from the center of the partial global map by a predetermined distance or more, for example, the process from the acquisition of the partial global map (step S304) based on the latest position of the terminal device 100 can be performed.

A user can view the global map which is updated by such map update process on the screen of the terminal device 100 by using the display function provided through the global map delivery unit 60 of the map management server 10 and the display control unit 190 of the terminal device 100.

5. ALTERNATIVE EXAMPLE

[5-1. Super Client]

The case where the map update process is performed between the map management server 10 and the terminal device 100 is mainly described above. However, the present invention is not limited thereto. For example, the terminal device 100 possessed by any user may have a global map management function similar to that of the map management server 10. Such terminal device is referred to as a super client in this section.

FIG. 17 is a block diagram illustrating an example of a configuration of a super client 200 as an example. Referring to FIG. 17, the super client 200 includes a communication interface 210, a server processing module 220, a client processing module 230 and a display control unit 240.

The communication interface 210 is an interface that mediates a communication connection between the super client 200 and another terminal device (for example, the terminal device 100 illustrated in FIG. 5). The communication interface 210 may be a wireless communication interface or a wired communication interface.

The server processing module 220 is a module that has a global map management function similar to that of the map management server 10 described above. The server processing module 220 includes the global map storage unit 30, the partial global map extracting unit 40, the updating unit 50 and the global map delivery unit 60. The server processing module 220 performs the map update process as described with reference to FIG. 16 with another terminal device and further performs the map update process also with the client processing module 230 to be described later.

The client processing module 230 is a module that has a global map update and viewing function and the like similar to that of the map management server 10 described above. The client processing module 230 includes the imaging unit 110, the initializing unit 120, the global map acquiring unit 130, the storage unit 132, the local map generating unit 140, the calculating unit 160, the converting unit 170 and the updating unit 180.

The display control unit 240, in response to an instruction from a uses; at least partially visualizes the global map stored in the global map storage unit 30 of the server processing module 220 and outputs it to a screen. Further, the display control unit 240 may visualize Use partial global map or the local map stored in the storage unit 132 of the client processing module 230 and output it to the screen.

Use of the above-described super client 200 and one or more terminal device 100 enables a plurality of users to share one global map through a communication connection using P2P (Peer to Peer), for example.

[5-2. Sharing of Additional Information]

Figure 18:
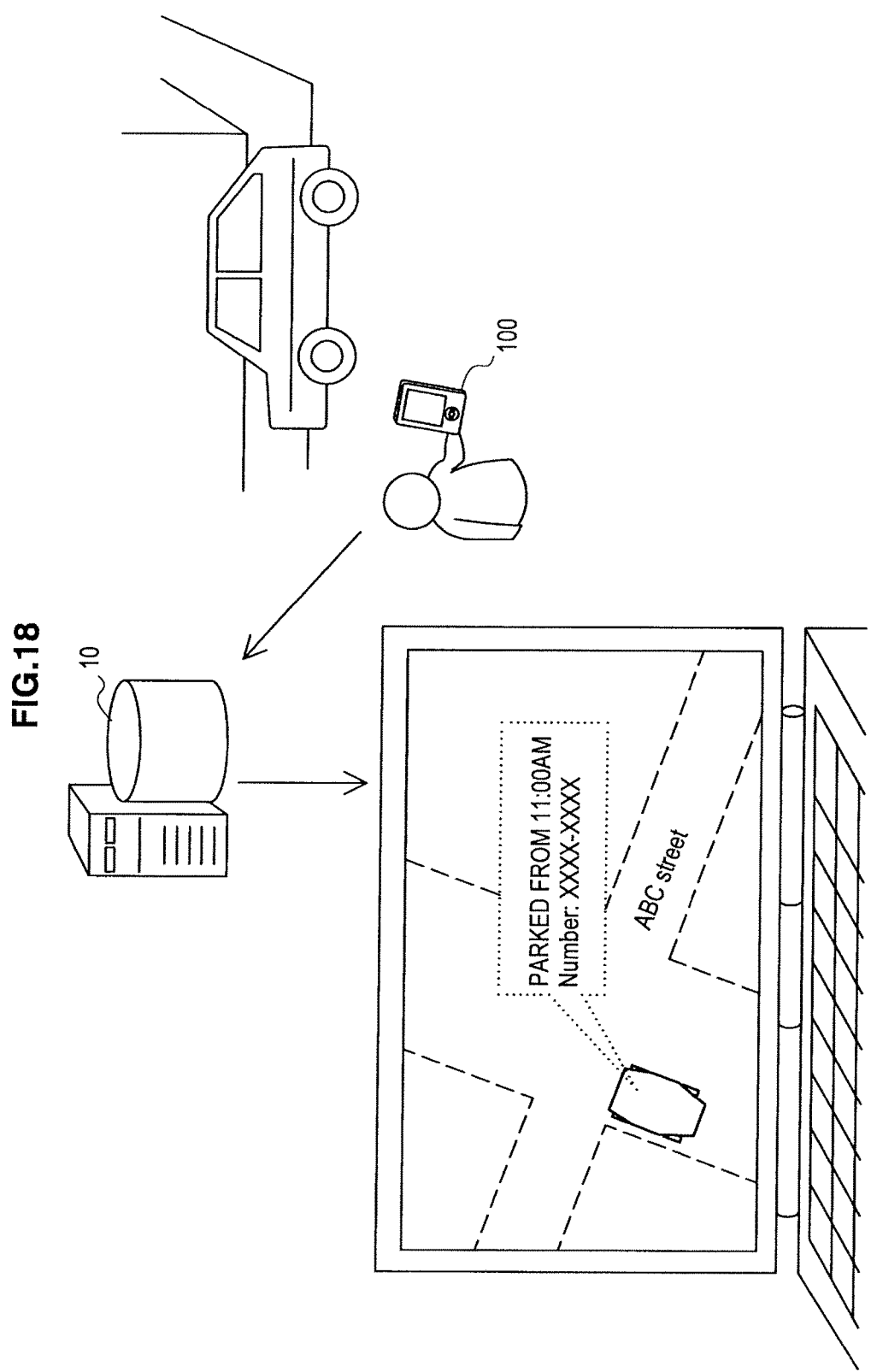
FIG. 18 is a schematic diagram illustrating an example of an application of sharing of additional information.

The terminal device 100 may transmit additional information such as an image captured using the imaging unit 110 and the like, for example, in association with coordinate data together with the partial global map to the map management server 10. Then, the additional information is made viewable through the global map delivery unit 60 of the map management server 10 and the display control unit 190 of the terminal device 100, thereby enabling a plurality of users to share the additional information associated with the global map which is updated dynamically. The additional information may be the actual image captured in the terminal device 100 or a recognition result such as characters present on the image, for example. For example, by sharing reading results of the numbers of cars parked in the streets in association with position data of the cars in the global map, it can be used for detection of traffic violation in no-parking zones and the like (cf. FIG. 18). Further, by sharing price information of products in each store of shopping streets in association with position data of the products in the global map, it is expected to improve the convenience for shopping by users and to promote the sales of the products. Furthermore, by sharing data of stocks in a warehouse in association with position data of the products in the global map, stock control is facilitated.

6. SUMMARY

One embodiment of the present invention and its application are described above with reference to FIGS. 1 to 18. According to the embodiment, in the information processing device such as the terminal device 100 or the super client 200, the partial global map, which is at least a part of the global map representing positions of physical objects present in the real space where a plurality of users are in activity, is acquired, and the local map representing positions of nearby objects detectable by the device is generated. Then, the partial global map and the global map shared among a plurality of users are updated based on the position data of objects included in the local map. It is thereby possible to quickly share a change in position of an object in the real space among users. Further, because the position data of objects in the vicinity of the terminal device 100 which are detected in the local map generation process can be added to the global map, even in the space where a detailed map is not provided by a service provider, more detailed position data of objects can be shared among users.

According to the embodiment, after the relative position and posture of the local map on the basis of the global coordinate system are calculated based on the position data of objects included in the partial global map and the position data of objects included in the local map, the above-described update process is performed using the position data of the local map which is coordinate-converted according to the calculation result. Therefore, no restrictions are placed on the local map coordinate system, and therefore a user can freely carry the information processing device and share the dynamically updated global map with other users.

Further, according to the embodiment, the above-described partial global map is acquired from the server device that stores the global map. The partial global map is a subset of the global map which is extracted according to information related to the position of the information processing device in the real space. Therefore, when sharing the global map among a plurality of users, an increase in communication costs for the update process of the global map is suppressed.

Further, according to the embodiment, by application of the SLAM technique, the local map is generated based on an input image from an imaging device and feature data indicating features of appearances of objects. Therefore, even when the information processing device is provided only with a monocular camera, the global map can be updated by detecting the positions of objects with high accuracy.

Further, according to the embodiment, the global map and the local map include position data of objects the real space and time stomp related to the position data. This allows prevention of contention for update among a plurality of users by comparison of the time stamp and enables viewing of the past position data designated by a user, for example.

The series of processes by the information processing device 100 described in this specification is typically implemented using software. A program composing the software that implements the series of processes may be prestored in a storage medium mounted internally or externally to each device, for example. Then, each program is read into a random access memory (RAM) and executed by a processor such as a central processing unit (CPU).

Although preferred embodiments of the present invention are described in detail above with reference to the appended drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
   a global map acquiring unit that acquires a part of a global map representing positions of one or more feature points on objects in a real space,
   wherein the global map is generated based on data from devices of a plurality of users;
   a local map generating unit that generates a local map representing positions of the one or more feature points on objects detectable by a first device of one user among the plurality of users,
   wherein the local map is generated based on data from the device of a single user;
   a position generation unit that generates a position of the first device of the user in the global map, based on feature points in the local map and feature points of the global map; and
   an updating unit that updates the global map based on the one or more feature points included in the local map,
   wherein the positions of feature points in the global map and the local map are defined as three-dimensional position, and
   wherein the global map acquiring unit, the local map generating unit, the position generation unit, and the updating unit are each implemented via at least one processor.

2. The information processing device according to claim 1, further comprising:
   a calculating unit that calculates a relative position of the local map to the global map based on the one or more feature points included in the global map and the one or more feature points included in the local map,
   wherein the calculating unit is implemented via at least one processor.

3. The information processing device according to claim 2, further comprising:
   a converting unit that performs coordinate conversion from position data of the one or more feature points included in the local map to data of a coordinate system of the global map according to the relative position of the local map, wherein the updating unit updates the global map by using the position data of the one or more feature points included in the local map after the coordinate conversion by the converting unit,
   wherein the converting unit is implemented via at least one processor.

4. The information processing device according to claim 1, wherein the information processing device is a terminal device possessed by the user.

5. The information processing device according to claim 3, wherein the global map acquiring unit acquires at least a part of the global map from a server device storing the global map.

6. The information processing device according to claim 4, wherein the global map acquiring unit acquires a part of the global map corresponding to a local area containing a position of the terminal device in the real space.

7. The information processing device according to claim 4, wherein the global map acquiring unit acquires a part of the global map representing positions of a predetermined number of objects located in close proximity to the terminal device.

8. The information processing device according to claim 1, wherein the local map generating unit generates the local map based on an input image obtained by imaging the real space using an imaging device and feature data indicating a feature of appearance of one or more objects.

9. The information processing device according to claim 3, wherein the calculating unit calculates the relative position of the local map based on position data of an immobile object included in common in the global map and the local map.

10. The information processing device according to claim 3, wherein the calculating unit calculates the relative position of the local map so that, when converting the position data of the one or more feature points included in the local map into the data of the coordinate system of the global map, a difference between the data after conversion and the position data of the one or more feature points included in the global map is smaller as a whole.

11. The information processing device according to claim 1, wherein the global map includes position data of each object in the real space in a coordinate system of the global map and a time stamp related to the position data.

12. The information processing device according to claim 1, wherein the global map acquiring unit is configured so as not to acquire any global map other than one that is within a predetermined distance from the information processing device.

13. An information processing method comprising:
   acquiring a part of a global map representing positions of one or more feature points on objects in a real space,
   wherein the global map is generated based on data from devices of a plurality of users;
   generating a local map representing positions of the one or more feature points on objects detectable by a first device of one user among the plurality of users;
   generating a position of the first device of the user in the global map, based on feature points in the local map and feature points of the global map; and
   updating the global map based on the one or more feature points included in the local map,
   wherein the positions of feature points in the global map and the local map are defined as three-dimensional position.

14. An information processing device comprising:
   circuitry configured to
   acquire a part of a global map representing positions of one or more feature points on objects in a real space,
   wherein the global map is generated based on data from devices of a plurality of users;
   generate a local map representing positions of the one or more feature points on objects detectable by a first device of one user among the plurality of users,
   wherein the local map is generated based on data from the device of a single user;
   generate a position of the first device of the user in the global map, based on feature points in the local map and feature points of the global map; and
   update the global map based on the one or more feature points included in the local map,
   wherein the positions of feature points in the global map and the local map are defined as three-dimensional position.

15. An information processing system comprising:
   a server device that stores a global map representing positions of one or more feature points on objects in a real space, wherein the global map is generated based on data from devices of a plurality of users; and
   an information processing device possessed by one user among the plurality of users, the information processing device including:

a global map acquiring unit that acquires a part of the global map representing positions of one or more feature points on objects in a real space,
wherein the global map is generated based on data from devices of the plurality of users;
a local map generating unit that generates a local map representing positions of the one or more feature points on objects detectable by a first device of one user among the plurality of users,
wherein the local map is generated based on data from the device of a single user;
a position generation unit that generates a position of the first device of the user in the global map, based on feature points in the local map and feature points of the global map; and
an updating unit that updates the global map based on the one or more feature points included in the local map,
wherein the positions of feature points in the global map and the local map are defined as three-dimensional position, and
wherein the global map acquiring unit, the local map generating unit, the position generation unit, and the updating unit are each implemented via at least one processor.

* * * * *